(12) United States Patent
Tanaka

(10) Patent No.: US 11,330,117 B2
(45) Date of Patent: May 10, 2022

(54) INFORMATION PROCESSING APPARATUS, INFORMATION PROCESSING SYSTEM, AND INFORMATION PROCESSING METHOD FOR RECEIVING AN IMAGE DISPLAYED ON AN IMAGE DISPLAY APPARATUS UPON DETECTING A PREDETERMINED CONDITION IS SATISFIED

(71) Applicant: Takehiro Tanaka, Kanagawa (JP)

(72) Inventor: Takehiro Tanaka, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/951,265

(22) Filed: Nov. 18, 2020

(65) Prior Publication Data

US 2021/0168245 A1 Jun. 3, 2021

(30) Foreign Application Priority Data

Nov. 29, 2019 (JP) .............................. JP2019-217396
Jun. 5, 2020 (JP) .............................. JP2020-098901

(51) Int. Cl.
*H04N 1/00* (2006.01)
*H04N 5/232* (2006.01)
*G06K 15/02* (2006.01)

(52) U.S. Cl.
CPC ..... *H04N 1/00244* (2013.01); *H04N 1/00225* (2013.01); *H04N 5/23238* (2013.01); *G06K 15/1886* (2013.01); *H04N 1/00442* (2013.01); *H04N 2201/0039* (2013.01); *H04N 2201/0094* (2013.01)

(58) Field of Classification Search
None
See application file for complete search history.

(56) References Cited

U.S. PATENT DOCUMENTS

| 9,041,973 B2* | 5/2015 | Tabata | H04N 7/15 |
| | | | 358/1.15 |
| 10,721,235 B2 | 7/2020 | Iwashita | |
| 2011/0064330 A1* | 3/2011 | Hikichi | H04N 19/40 |
| | | | 382/305 |
| 2012/0147420 A1* | 6/2012 | Nishimi | G06F 3/1292 |
| | | | 358/1.15 |
| 2013/0003115 A1* | 1/2013 | Uchikawa | G06F 3/1259 |
| | | | 358/1.15 |
| 2013/0016396 A1* | 1/2013 | Ohara | G06K 15/1885 |
| | | | 358/1.15 |
| 2018/0241786 A1* | 8/2018 | Goto | H04N 1/00 |

FOREIGN PATENT DOCUMENTS

| JP | 2003-009107 | 1/2003 |
| JP | 2018-061217 | 4/2018 |

* cited by examiner

*Primary Examiner* — Haris Sabah
(74) *Attorney, Agent, or Firm* — IPUSA, PLLC

(57) ABSTRACT

An information processing apparatus includes processing circuitry; and a memory storing computer-executable instructions that cause the processing circuitry to transmit an image acquisition request to an image display apparatus upon detecting that a predetermined condition is satisfied; receive image data of an image displayed on the image display apparatus, transmitted from the image display apparatus in response to the image acquisition request; and store the received image data in a shared storage destination.

6 Claims, 21 Drawing Sheets

IN ORDER TO DISPLAY ON IWB, PLEASE READ FOLLOWING TWO-DIMENSIONAL CODE OR ACCESS
http://192.168.0.2/page/a

2102

TO ADMINISTRATOR: PLEASE PLACE THIS PAPER SHEET CLOSE TO THE IWB.

UPLOAD PAGE

PDF, JPG, GIF, PNG FILE CAN BE UPLOADED AND DISPLAYED ON IWB.

[SELECT FILE]  NOT SELECTED

[TRANSMIT]

INFORMATION PROCESSING APPARATUS, INFORMATION PROCESSING SYSTEM, AND INFORMATION PROCESSING METHOD FOR RECEIVING AN IMAGE DISPLAYED ON AN IMAGE DISPLAY APPARATUS UPON DETECTING A PREDETERMINED CONDITION IS SATISFIED

CROSS-REFERENCE TO RELATED APPLICATION

The present application is based on and claims priority under 35 U.S.C. § 119 to Japanese Patent Application No. 2019-217396, filed on Nov. 29, 2019, and Japanese Patent Application No. 2020-098901, filed on Jun. 5, 2020, the contents of which are incorporated herein by reference in their entirety.

BACKGROUND OF THE INVENTION

1. Field of the Invention

The present invention relates to an information processing apparatus, an information processing system, and an information processing method.

2. Description of the Related Art

Patent Document 1 discloses a technique of storing, in a file server, a distribution material file to which a memo is attached, including document information and memo information, when the document information is displayed on a display means included in an electronic conference terminal and the memo information is written into the document information by using a tablet for inputting information with a pen.

Patent Document 1: Japanese Unexamined Patent Application Publication No. 2003-9107

SUMMARY OF THE INVENTION

According to one aspect of the present invention, there is provided an information processing apparatus including processing circuitry; and a memory storing computer-executable instructions that cause the processing circuitry to transmit an image acquisition request to an image display apparatus upon detecting that a predetermined condition is satisfied; receive image data of an image displayed on the image display apparatus, transmitted from the image display apparatus in response to the image acquisition request; and store the received image data in a shared storage destination.

DETAILED DESCRIPTION OF THE PREFERRED EMBODIMENTS

In the conventional technology, in a case where a content is written into an image displayed on an image display apparatus, and subsequently, the power of the image display apparatus is switched off without storing the image, the image into which the content has been written cannot be shared among a plurality of terminal apparatuses.

In order to avoid such a situation, the user of the image display apparatus needs to frequently perform operations for storing the image; however, this method is troublesome and there may be cases where the user forgets to store the image.

A problem to be addressed by an embodiment of the present invention is to more reliably store, in a shared storage destination, an image file of an image displayed on an image display apparatus, without requiring troublesome tasks by the user.

Hereinafter, an embodiment of the present invention will be described with reference to the drawings.

<Configuration of Information Processing System>

Figure 1:
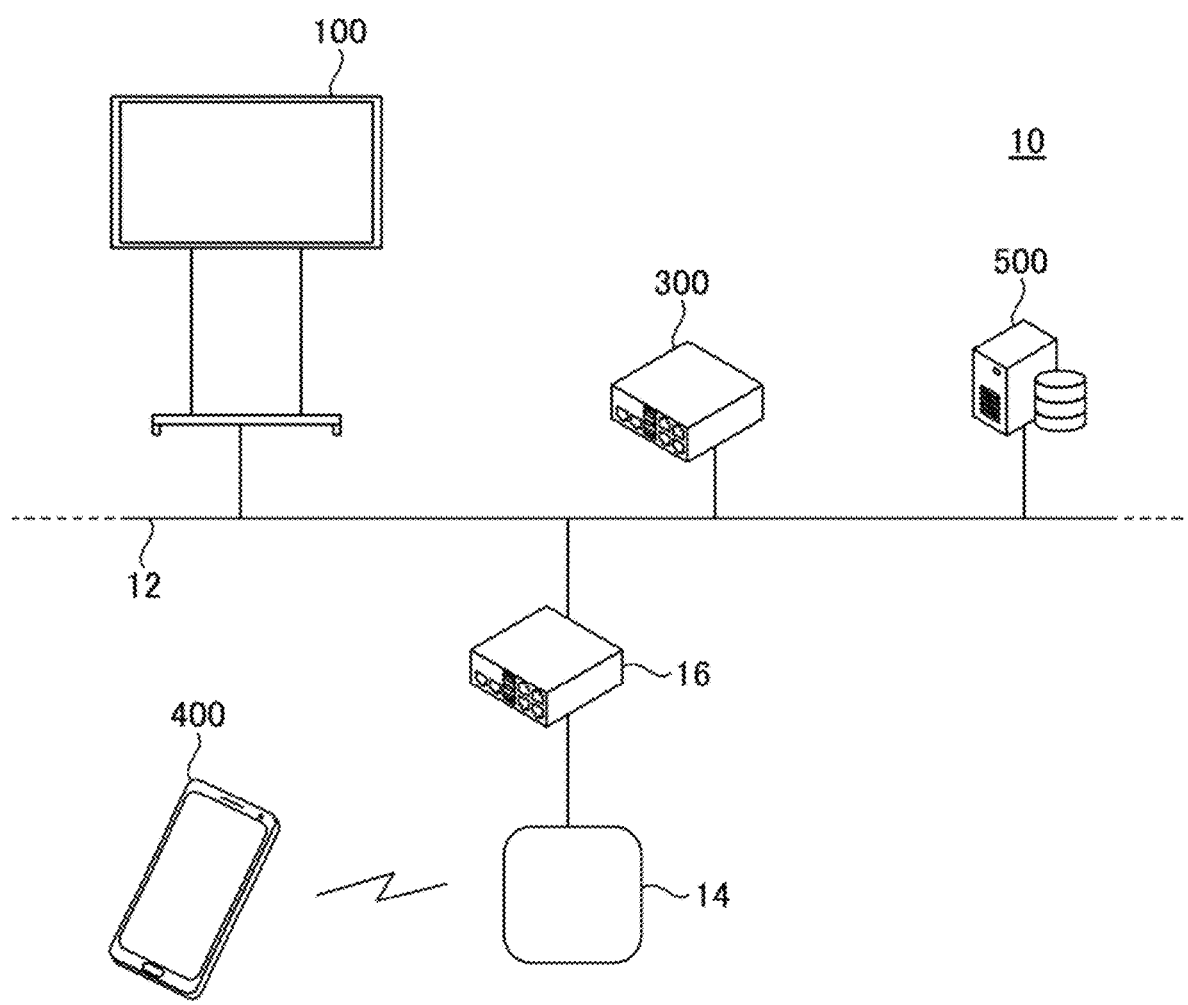
FIG. 1 is a diagram illustrating the configuration of an information processing system according to an embodiment of the present invention.

FIG. 1 is a diagram illustrating a configuration of an information processing system 10 according to an embodiment of the present invention. As illustrated in FIG. 1, the information processing system 10 according to the present embodiment includes an Interactive White Board (IWB) 100, a file server 500, a Software Defined Network (SDN) controller 300, and a smartphone 400. These plurality of devices are capable of communicating with each other via a communication network 12.

The IWB 100 is an example of an "image display apparatus" and is an apparatus capable of displaying an image, accepting writing into an image, etc. For example, the IWB 100 may acquire an image file transmitted from the smartphone 400 and display an image based on the image file. The IWB 100 can be used to write a content into the displayed image by a user, and the IWB 100 can transmit an image file representing the image into which the content has been written, to the smartphone 400 via the communication network 12.

The file server 500 is an example of a "shared storage destination" and is an apparatus for storing various files. For example, the file server 500 may store a plurality of image files that can be displayed by the IWB 100 and the smartphone 400. As an alternative to the file server 500, a cloud file server and the like may be used as another example of a "shared storage destination".

The SDN controller 300 defines a virtual network by software, dynamically changes the settings for a plurality of network devices (routers, switches, etc.) included in the network, and dynamically controls the data transfer in the network.

The SDN controller 300 according to the present embodiment functions as a web application server. Specifically, the SDN controller 300 provides a web application to the smartphone 400. This allows the smartphone 400 to transmit and receive image files to and from the IWB 100 by using the web application. In this case, the SDN controller 300 acts as an intermediary in transmitting and receiving image files between the smartphone 400 and the IWB 100. For example, the SDN controller 300 acquires an image display request and an image acquisition request transmitted from the smartphone 400 and transfers the image display request and the image acquisition request to the IWB 100. For example, the SDN controller 300 acquires an image file transmitted from the IWB 100 and transfers the image file to the smartphone 400.

The SDN controller 300 is an example of an "information processing apparatus" and has a function of storing, in the file server 500, an image file that is transmitted and received between the smartphone 400 and the IWB 100. For example, when an image file of an image to be displayed by the IWB 100, is transmitted from the smartphone 400 to the IWB 100, the SDN controller 300 causes an image file to be stored in the file server 500. For example, when an image file of an image to be displayed by the smartphone 400, is transmitted from the IWB 100 to the smartphone 400, the SDN controller 300 causes an image file to be stored in the file server 500.

The smartphone 400 is an example of a "terminal apparatus" used by a user. For example, the smartphone 400 may access the web application of the SDN controller 300 via an access point 14 and an SDN switch 16 (which controls access from the smartphone 400), thereby transmitting image files to the IWB 100 or acquiring image files from the IWB 100 via the web application. As the "terminal apparatus", a personal computer (PC), a tablet terminal, and the like may be used, other than the smartphone 400.

<First Use Scenario>

FIGS. 2 to 5 are diagrams illustrating a first use scenario of the information processing system 10 according to an embodiment of the present invention. Here, as the first use scenario, an example of automatically storing an image 20A when the image 20A is projected on the IWB 100, will be described.

Figure 2:
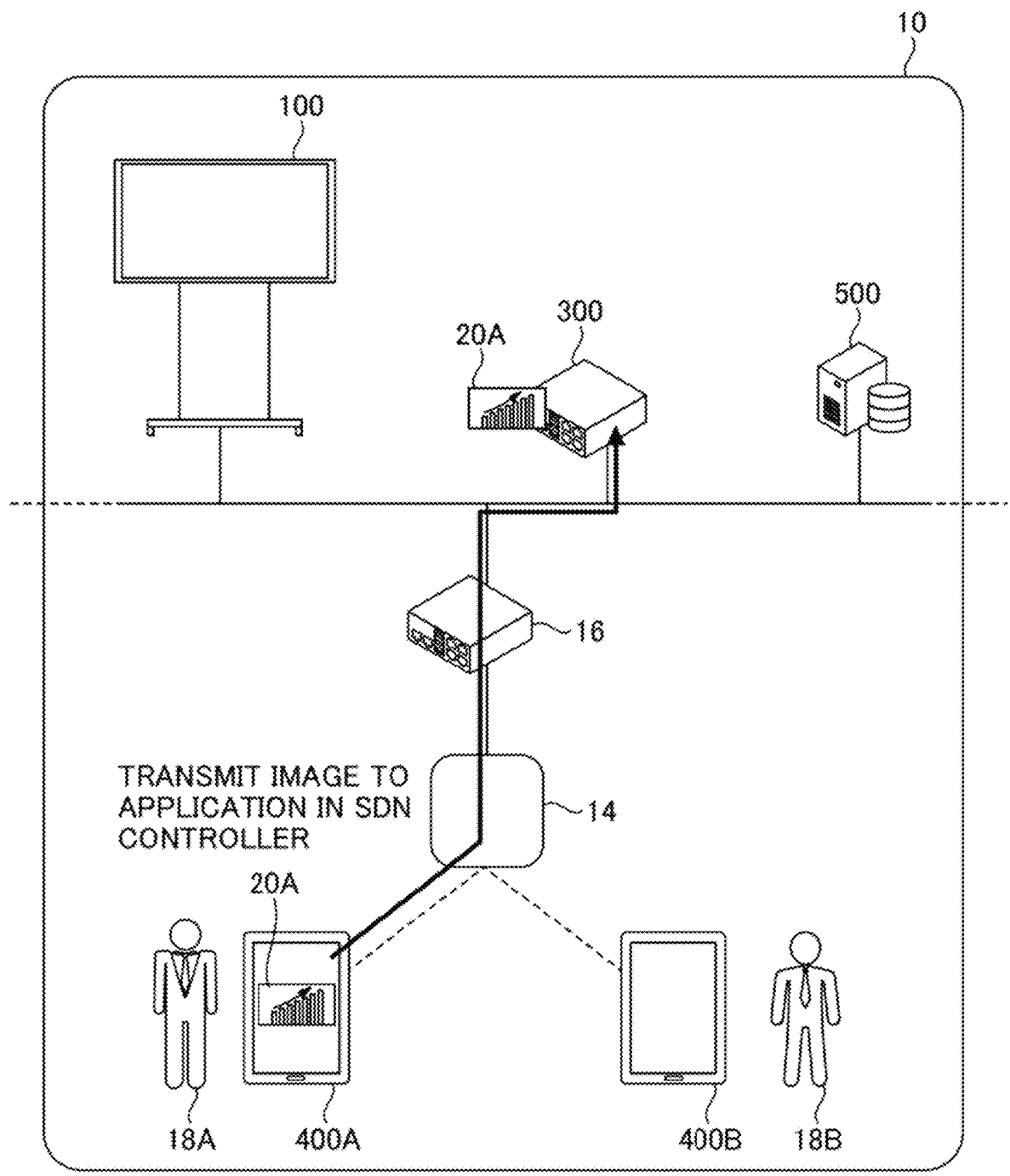
FIG. 2 is a diagram illustrating a first use scenario of the information processing system according to an embodiment of the present invention.

First, as illustrated in FIG. 2, an instructor 18A transmits the image 20A from a smartphone 400A possessed by the instructor 18A, to a web application on the SDN controller 300.

Figure 3:
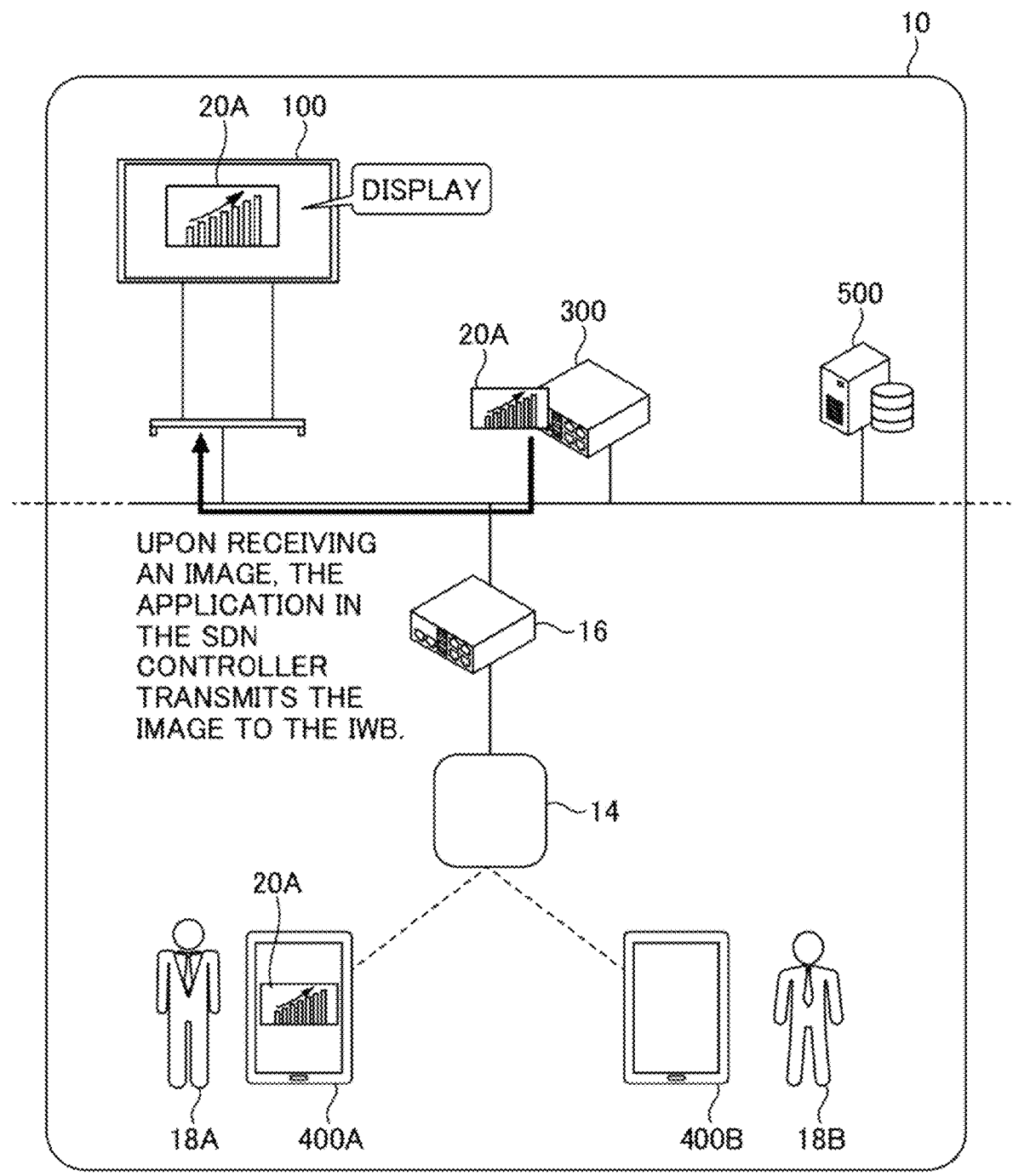
FIG. 3 is a diagram illustrating the first use scenario of the information processing system according to an embodiment of the present invention.

As illustrated in FIG. 3, when the web application on the SDN controller 300 receives the image 20A transmitted from the smartphone 400A, the web application transmits the image 20A to the IWB 100 and causes the IWB 100 to project the image 20A.

Figure 4:
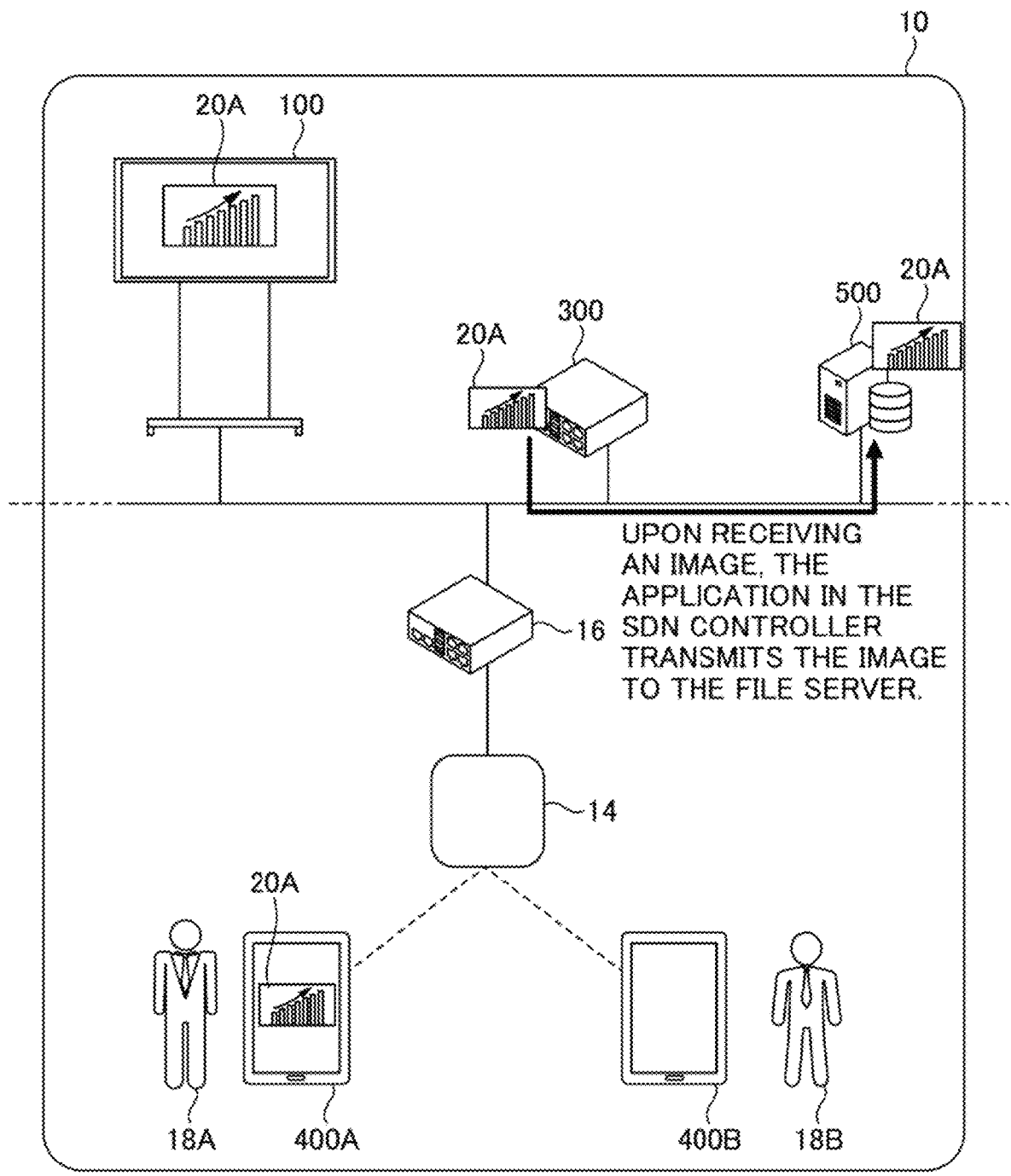
FIG. 4 is a diagram illustrating the first use scenario of the information processing system according to an embodiment of the present invention.

As illustrated in FIG. 4, after transmitting the image 20A to the IWB 100, the web application on the SDN controller 300 transmits the image 20A to the file server 500 and causes the file server 500 to store the image 20A.

Figure 5:
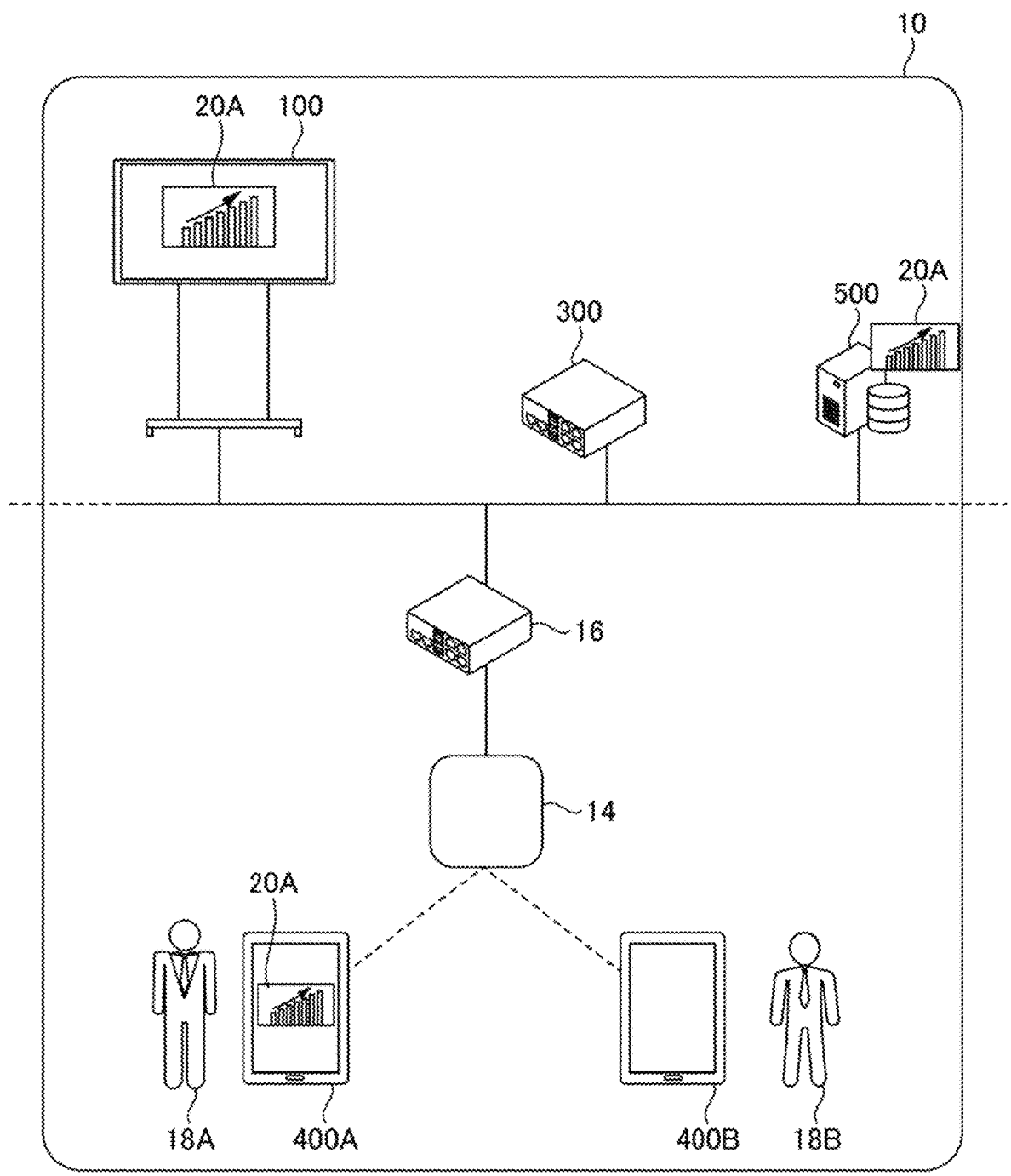
FIG. 5 is a diagram illustrating the first use scenario of the information processing system according to an embodiment of the present invention.

As a result, as illustrated in FIG. 5, the image 20A is projected by the IWB 100, and the image 20A is stored in the file server 500.

<Second Usage Scenario>

FIGS. 6 to 13 are diagrams illustrating a second use scenario of the information processing system 10 according to an embodiment of the present invention. Here, as the second usage scenario, an example of automatically storing an image 20B, which is an image obtained after writing into the displayed image, in the file server 500, when a download request is made for downloading the image 20B, will be described.

Figure 6:
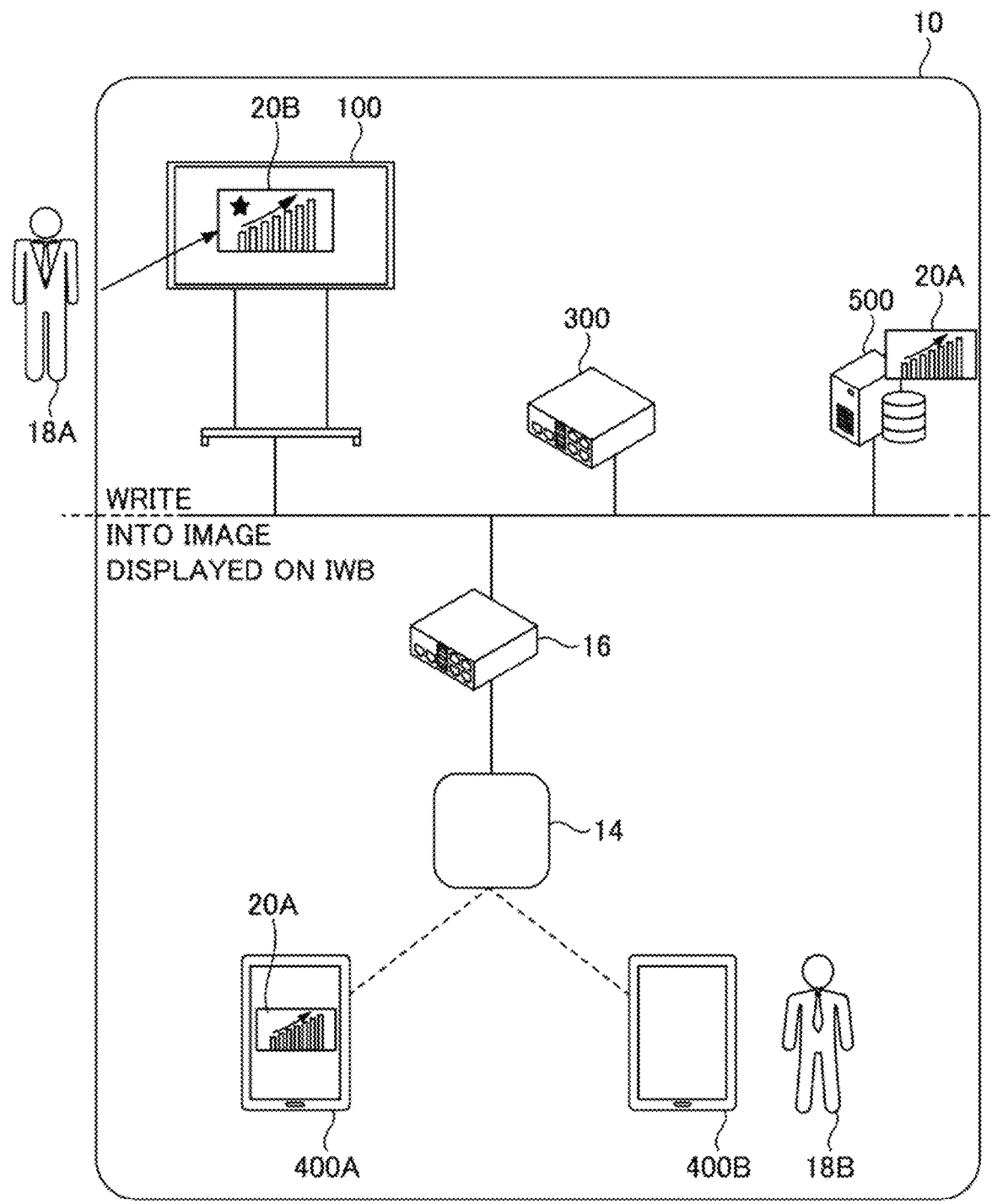
FIG. 6 is a diagram illustrating a second use scenario of the information processing system according to an embodiment of the present invention.

First, as illustrated in FIG. 6, the instructor 18A writes any writing content (in the example illustrated in FIG. 6, a star) into the image 20A projected by the IWB 100. Hereinafter, "the image 20B" is referred to as the image that is obtained after performing the writing.

Figure 7:
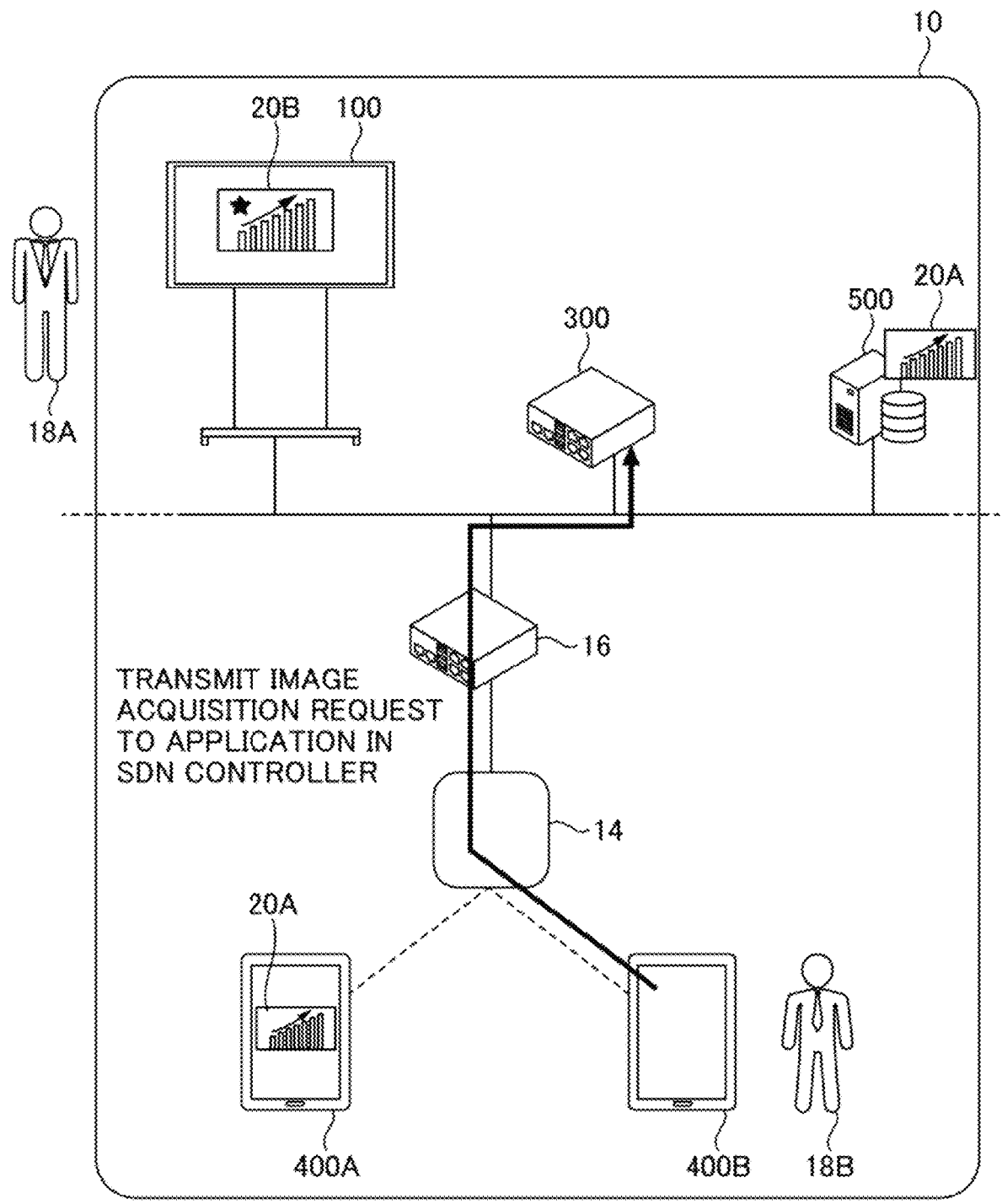
FIG. 7 is a diagram illustrating the second use scenario of the information processing system according to an embodiment of the present invention.

Next, as illustrated in FIG. 7, a student 18B transmits, from a smartphone 400B possessed by the student 18B, an image acquisition request (download request) to acquire the image 20B, to the web application on the SDN controller 300.

Figure 8:
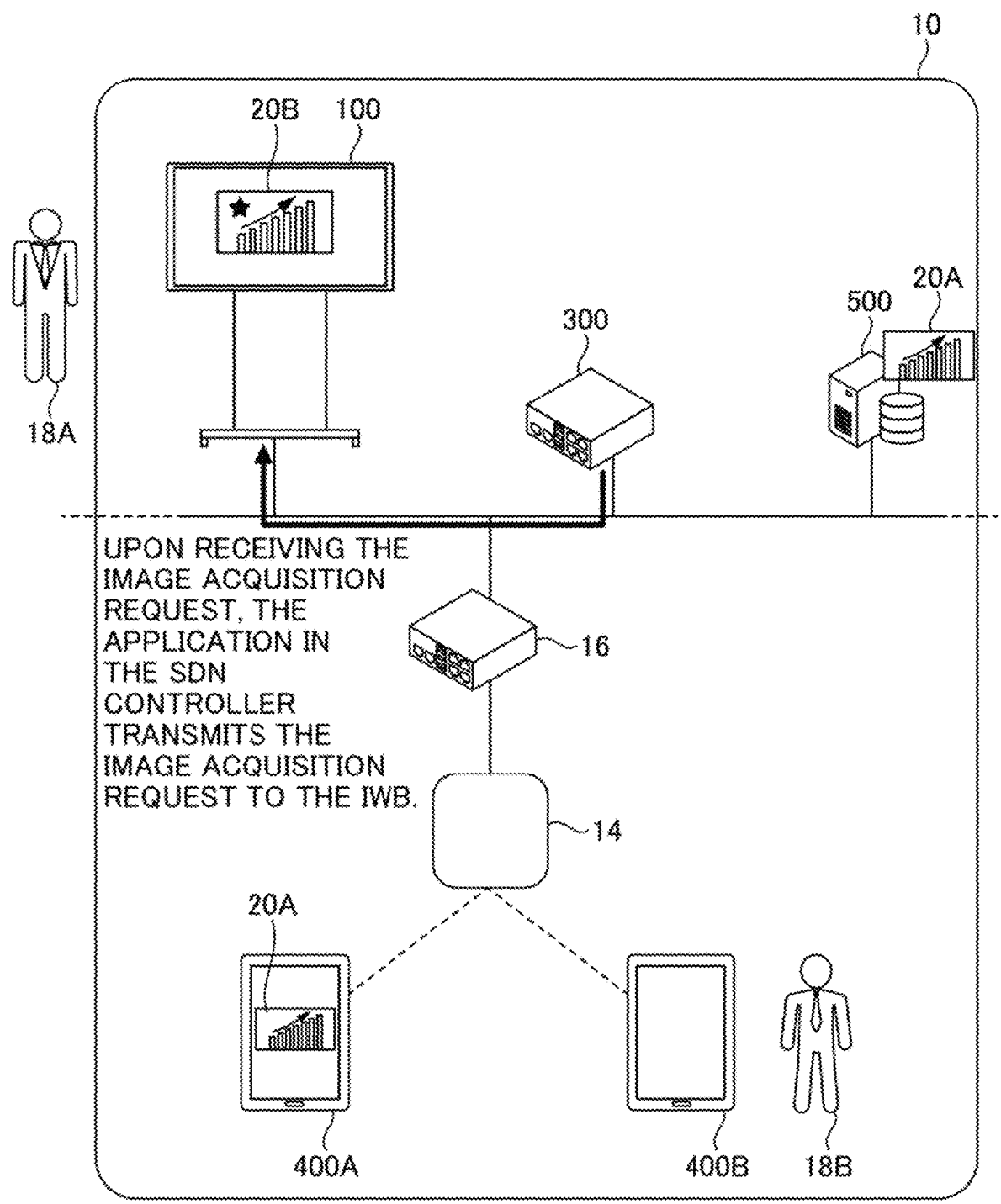
FIG. 8 is a diagram illustrating the second use scenario of the information processing system according to an embodiment of the present invention.

As illustrated in FIG. 8, when the web application on the SDN controller 300 receives the image acquisition request transmitted from the smartphone 400B, the web application on the SDN controller 300 transmits the image acquisition request to the IWB 100.

Figure 9:
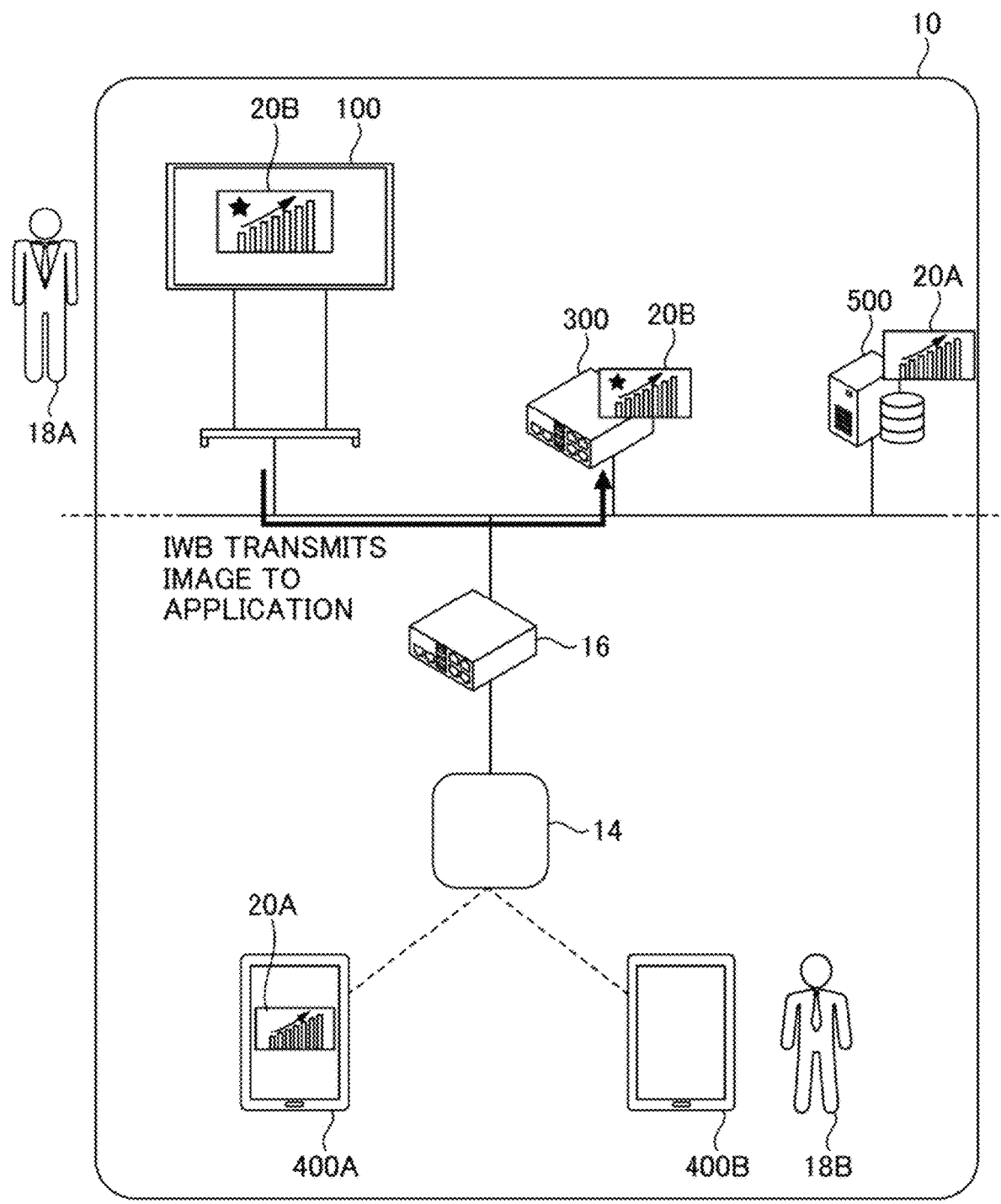
FIG. 9 is a diagram illustrating the second use scenario of the information processing system according to an embodiment of the present invention.

As illustrated in FIG. 9, when the IWB 100 receives the image acquisition request transmitted from the web application on the SDN controller 300, the IWB 100 transmits the image 20B projected by the IWB 100 to the web application on the SDN controller 300.

Figure 10:
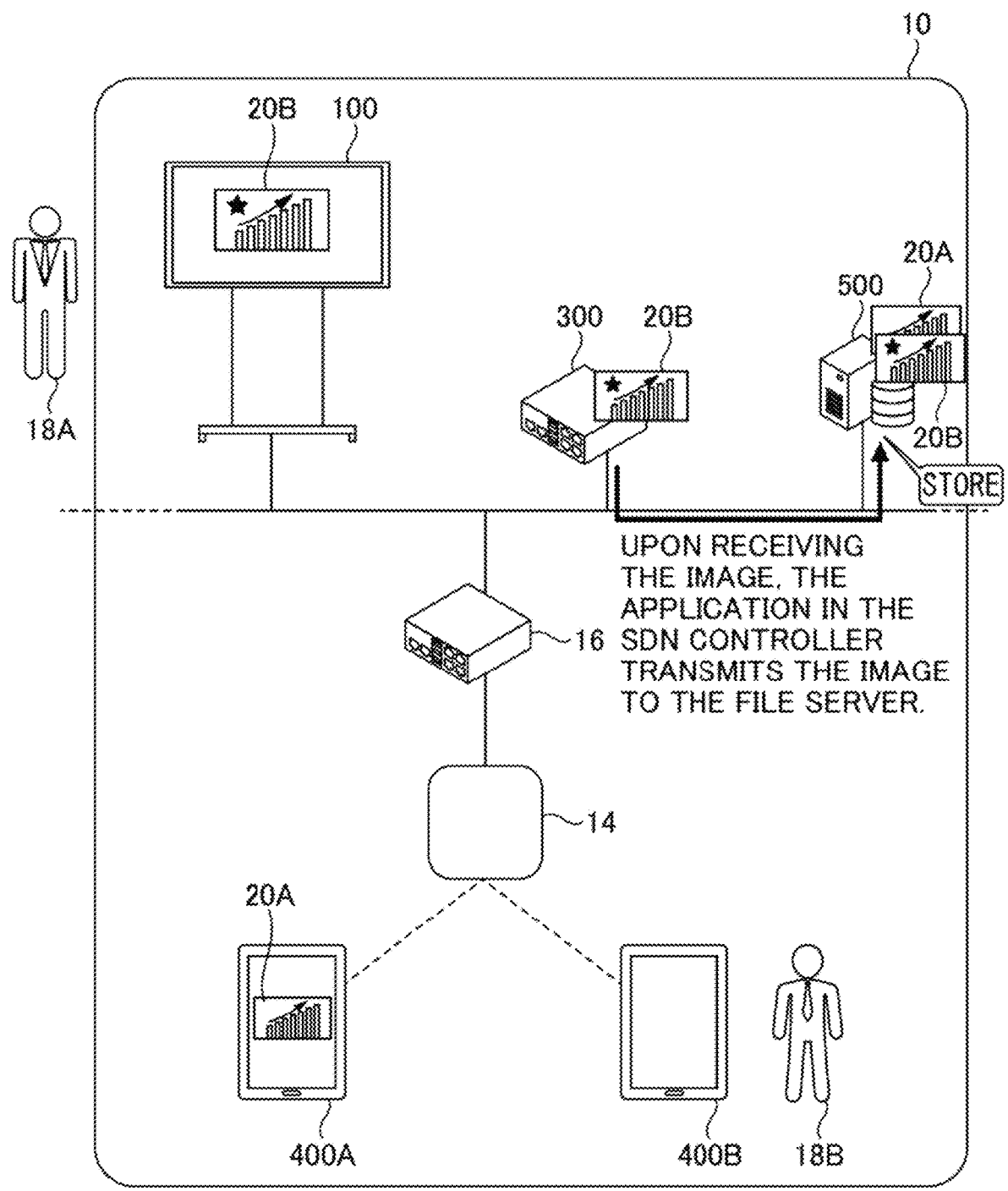
FIG. 10 is a diagram illustrating the second use scenario of the information processing system according to an embodiment of the present invention.

As illustrated in FIG. 10, when the web application on the SDN controller 300 receives the image 20B transmitted from the IWB 100, the web application on the SDN controller 300 transmits the image 20B to the file server 500 and causes the file server 500 to store the image 20B.

Figure 11:
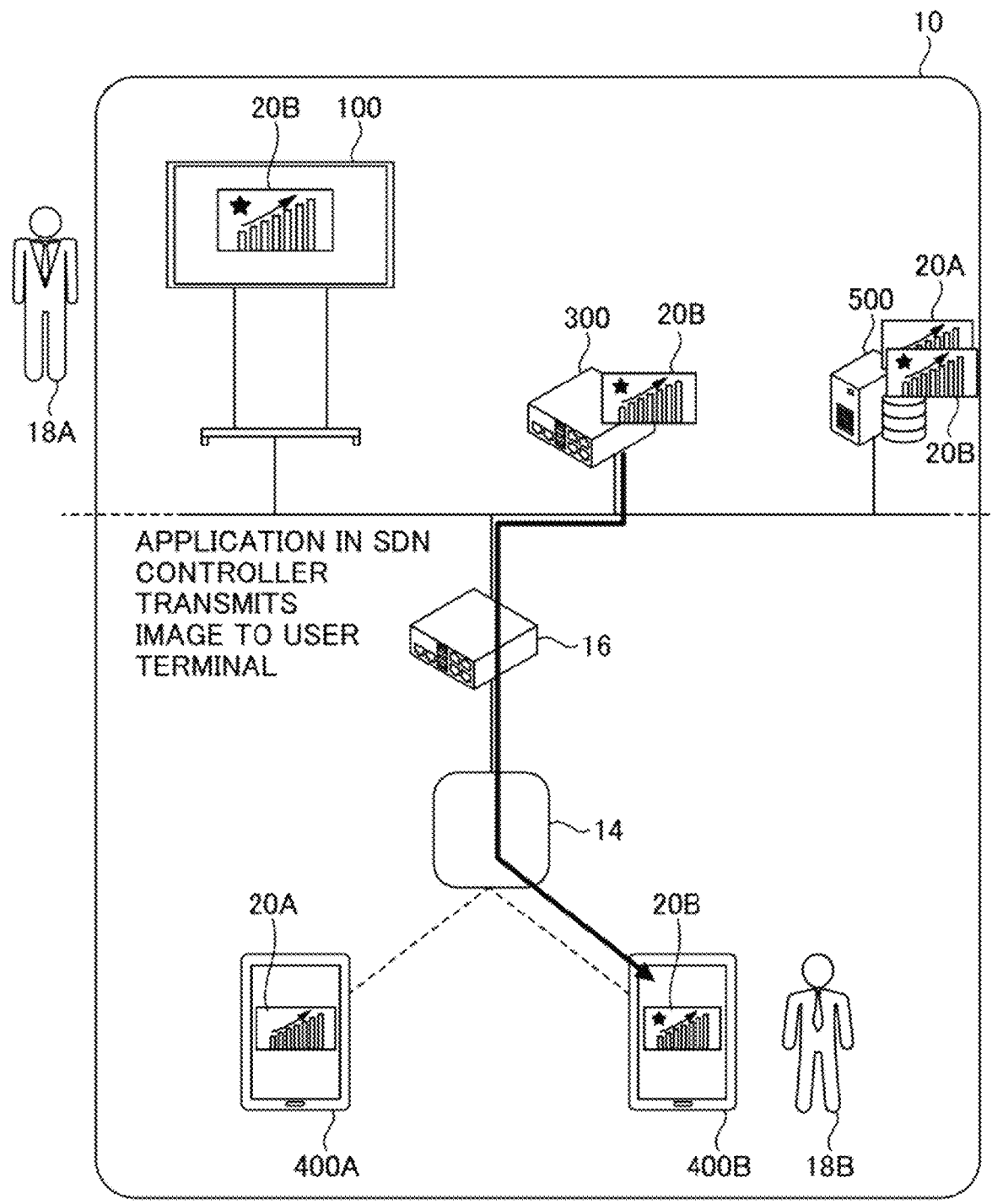
FIG. 11 is a diagram illustrating the second use scenario of the information processing system according to an embodiment of the present invention.

As illustrated in FIG. 11, after transmitting the image 20B to the file server 500, the web application on the SDN controller 300 transmits the image 20B to the smartphone 400B so that the image 20B can be used by the student 18B from the smartphone 400B.

Figure 12:
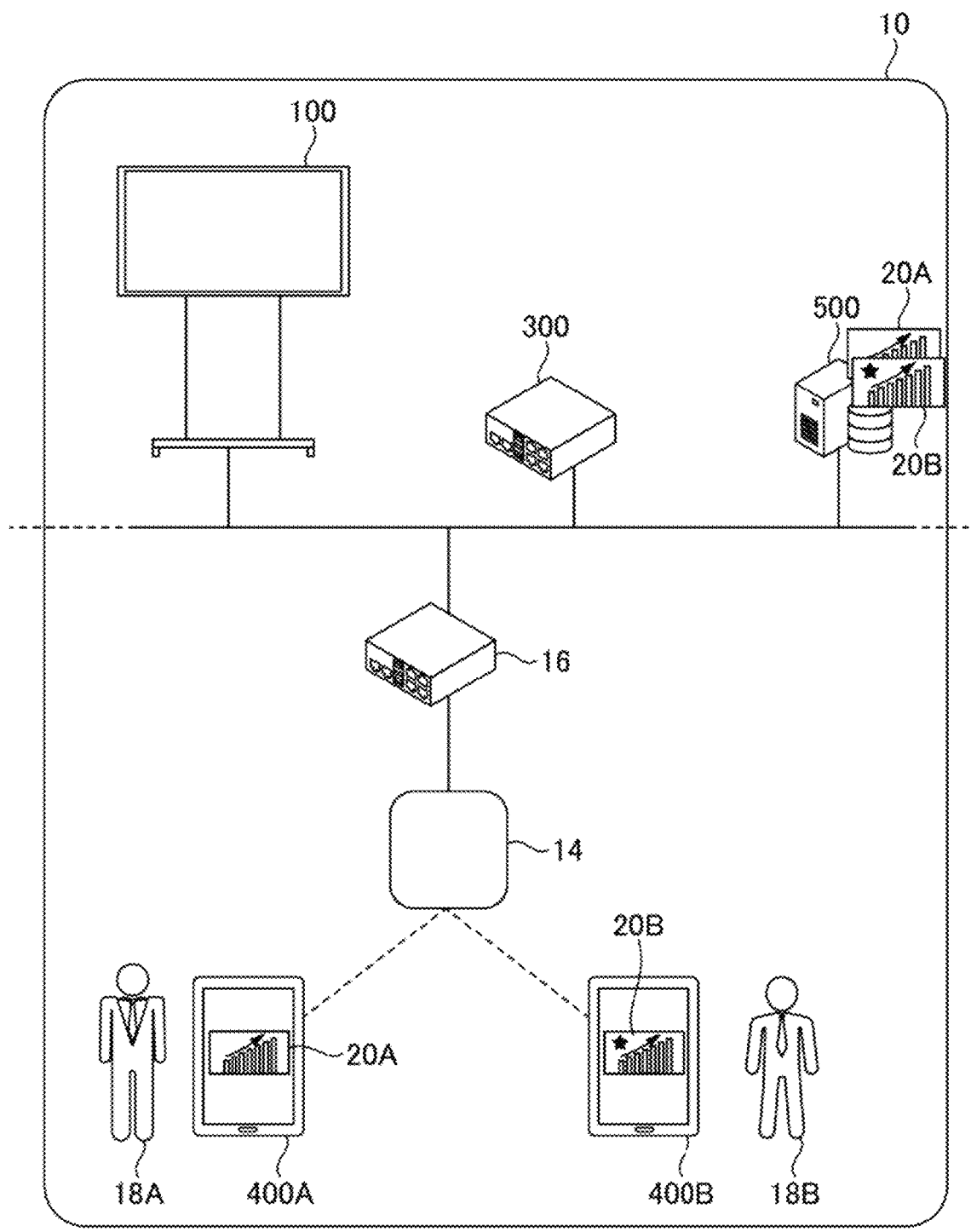
FIG. 12 is a diagram illustrating the second use scenario of the information processing system according to an embodiment of the present invention.

Thereafter, as illustrated in FIG. 12, the power of the IWB 100 is switched off without performing the process of storing the image 20B. However, at this point, in the file server 500, both the image 20A before performing the writing and the image 20B after performing the writing, are stored.

Figure 13:
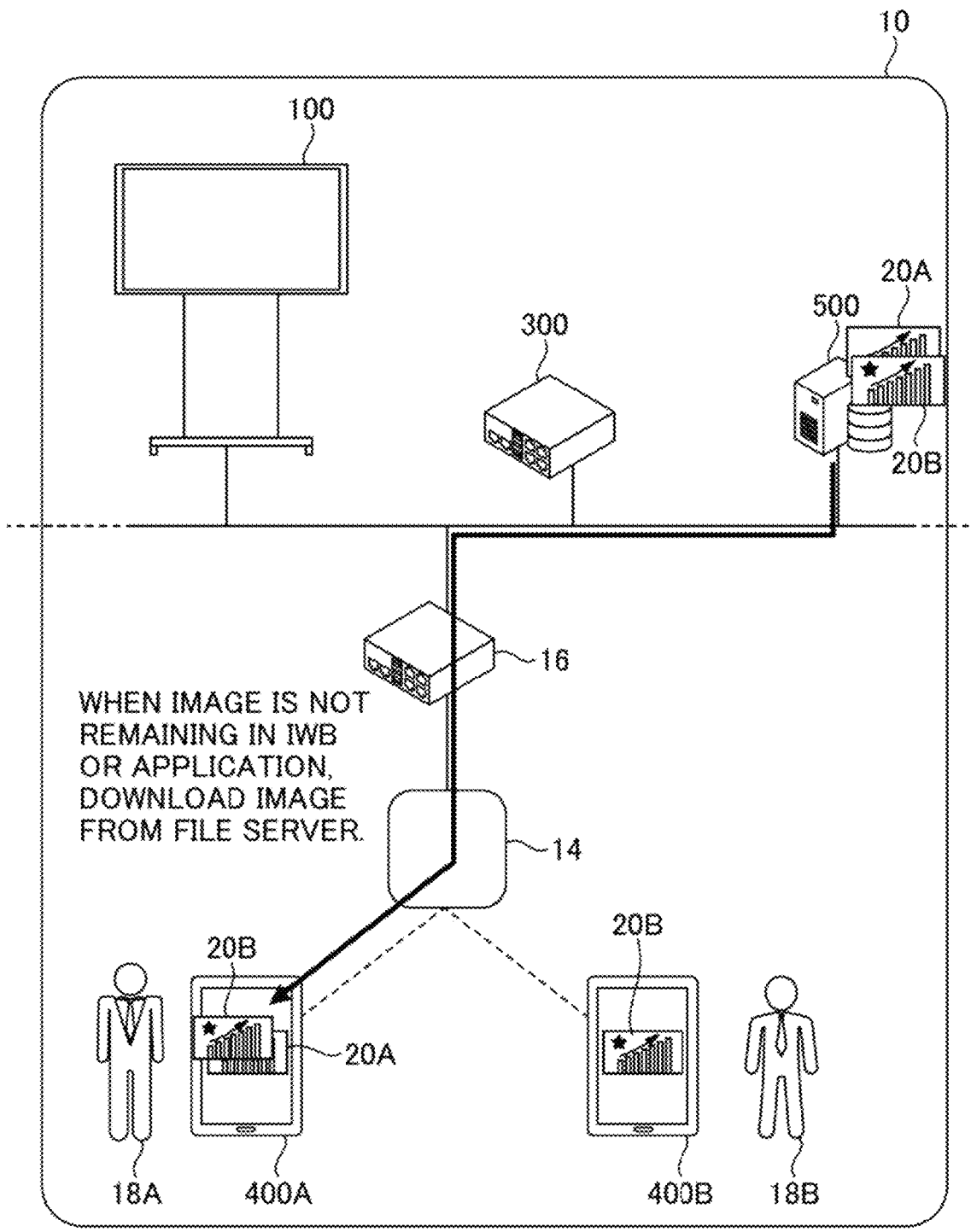
FIG. 13 is a diagram illustrating the second use scenario of the information processing system according to an embodiment of the present invention.

Thus, as illustrated in FIG. 13, the instructor 18A can download and use one or both of the image 20A and the image 20B from the file server 500 by using the smartphone 400A, even when the power of the IWB 100 is off. Similarly, the student 18B can download and use one or both of the image 20A and the image 20B from the file server 500 by using the smartphone 400B, even when the power of the IWB 100 is off.

<Hardware Configuration of the IWB 100>

Figure 14:
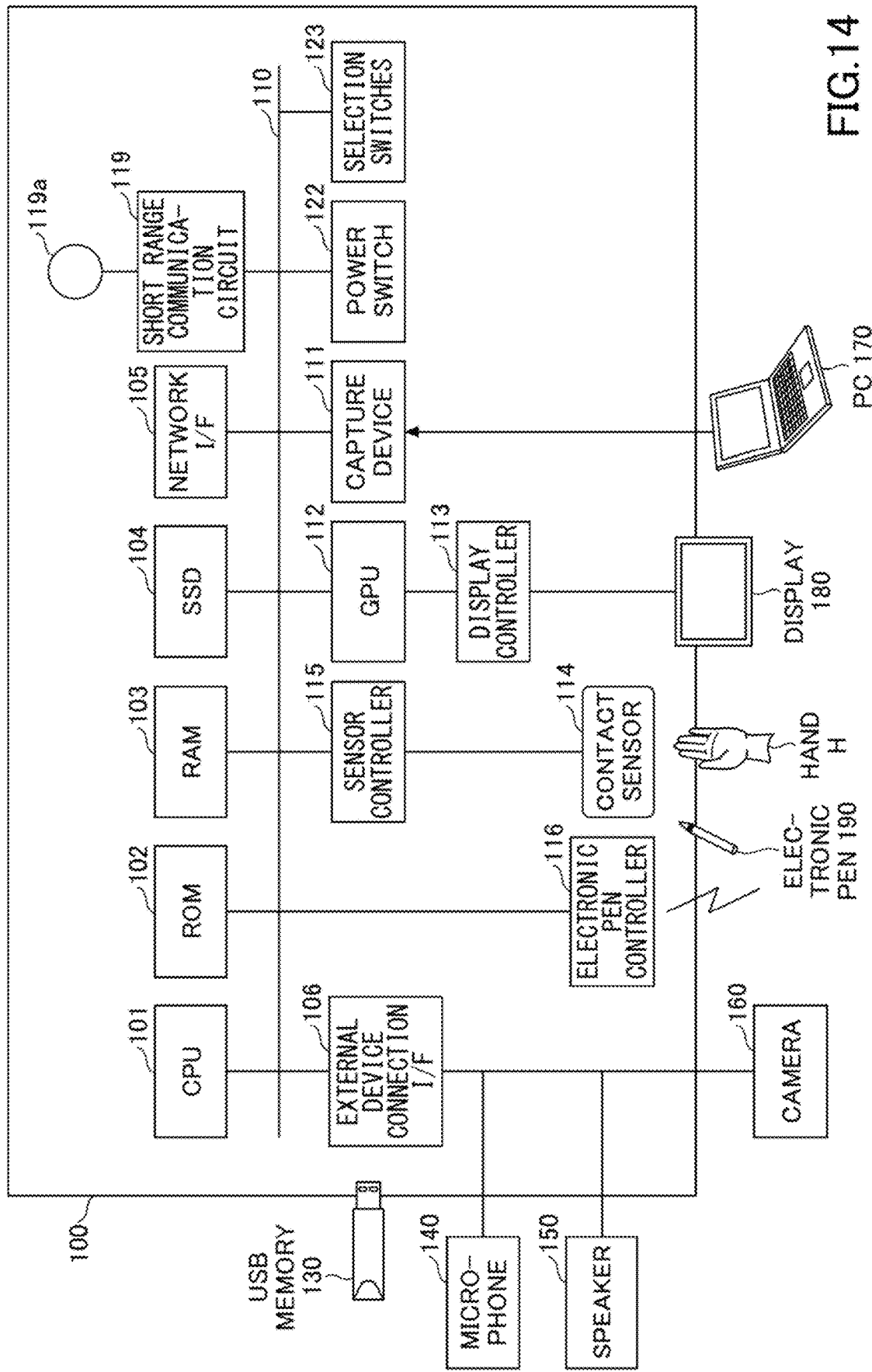
FIG. 14 is a hardware configuration diagram of an Interactive White Board (IWB) according to an embodiment of the present invention.

FIG. 14 is a hardware configuration diagram of the IWB 100. As illustrated in FIG. 14, the IWB 100 includes a central processing unit (CPU) 101, a read-only memory (ROM) 102, a random access memory (RAM) 103, a Solid State Drive (SSD) 104, a network interface (I/F) 105, and an external device connection I/F 106.

Among these, the CPU 101 controls the operations of the entire IWB 100. The ROM 102 stores a program used for driving the CPU 101, such as an Initial Program Loader (IPL). The RAM 103 is used as a work area of the CPU 101. The SSD 104 stores various kinds of data, such as a program for the IWB 100. The network I/F 105 controls the communication with the communication network 12. The external device connection I/F 106 is an interface for connecting various external devices. In this case, the external device is, for example, a Universal Serial Bus (USB) memory 130, or an externally-attached device (a microphone 140, a speaker 150, and a camera 160).

The IWB 100 also includes a capture device 111, a Graphics Processing Unit (GPU) 112, a display controller 113, a contact sensor 114, a sensor controller 115, an electronic pen controller 116, a short range communication circuit 119, an antenna 119a of the short range communication circuit 119, a power switch 122, and selection switches 123.

Among these, the capture device 111 causes the display of an external Personal Computer (PC) 170 to display video information as a still image or a moving image. The GPU 112 is a semiconductor chip that specifically handles graphics. The display controller 113 controls and manages the screen display to output an output image from the GPU 112 to a display 180 and the like. The contact sensor 114 detects that an electronic pen 190, a user's hand H, and the like is in contact with the display 180. The sensor controller 115 controls the processes of the contact sensor 114. The contact sensor 114 performs input of coordinates and detection of coordinates by an infrared blocking method. The method of inputting the coordinates and detecting the coordinates is a method of emitting a plurality of infrared rays parallel to the display 180 from two light emitting and receiving devices disposed at both end portions on the upper side of the display 180; reflecting the infrared rays by a reflecting member provided around the display 180; and receiving, by a light receiving element, the light returning along the same optical path as the emitted light. The contact sensor 114 outputs, to the sensor controller 115, an ID of an infrared ray, which is emitted by the two light emitting and receiving devices and blocked by an object, and the sensor controller 115 identifies the coordinate position that is the contact position of the object. The electronic pen controller 116 communicates with the electronic pen 190 to determine whether the tip of the pen or the butt of the pen has touched the display 180. The short range communication circuit 119 is a communication circuit such as Near Field Communication (NFC) or Bluetooth (registered trademark). The power switch 122 is a switch for switching the power of the IWB 100 on and off. The selection switches 123 are, for example, a group of switches for adjusting the lighting and the coloring of the display 180.

Further, the IWB 100 includes a bus line 110. The bus line 110 is an address bus, a data bus, and the like for electrically connecting elements such as the CPU 101 illustrated in FIG. 14.

The contact sensor 114 is not limited to an infrared blocking method. Various detection means may be used, such as a touch panel of an electrostatic capacitance type in which a contact position is identified by detecting a change in capacitance, a touch panel of a resistive film type in which a contact position is identified by a voltage change of two opposing resistive films, and a touch panel of an electromagnetic induction type in which an electromagnetic induction caused by a contact object contacting a display unit is detected to identify the contact position. The electronic pen controller 116 may determine a touch not only by the tip and the butt of the electronic pen 190, but also by a portion of the electronic pen 190 held by the user or other portions of the electronic pen 190.

<Hardware Configuration of the SDN Controller 300>

Figure 15:
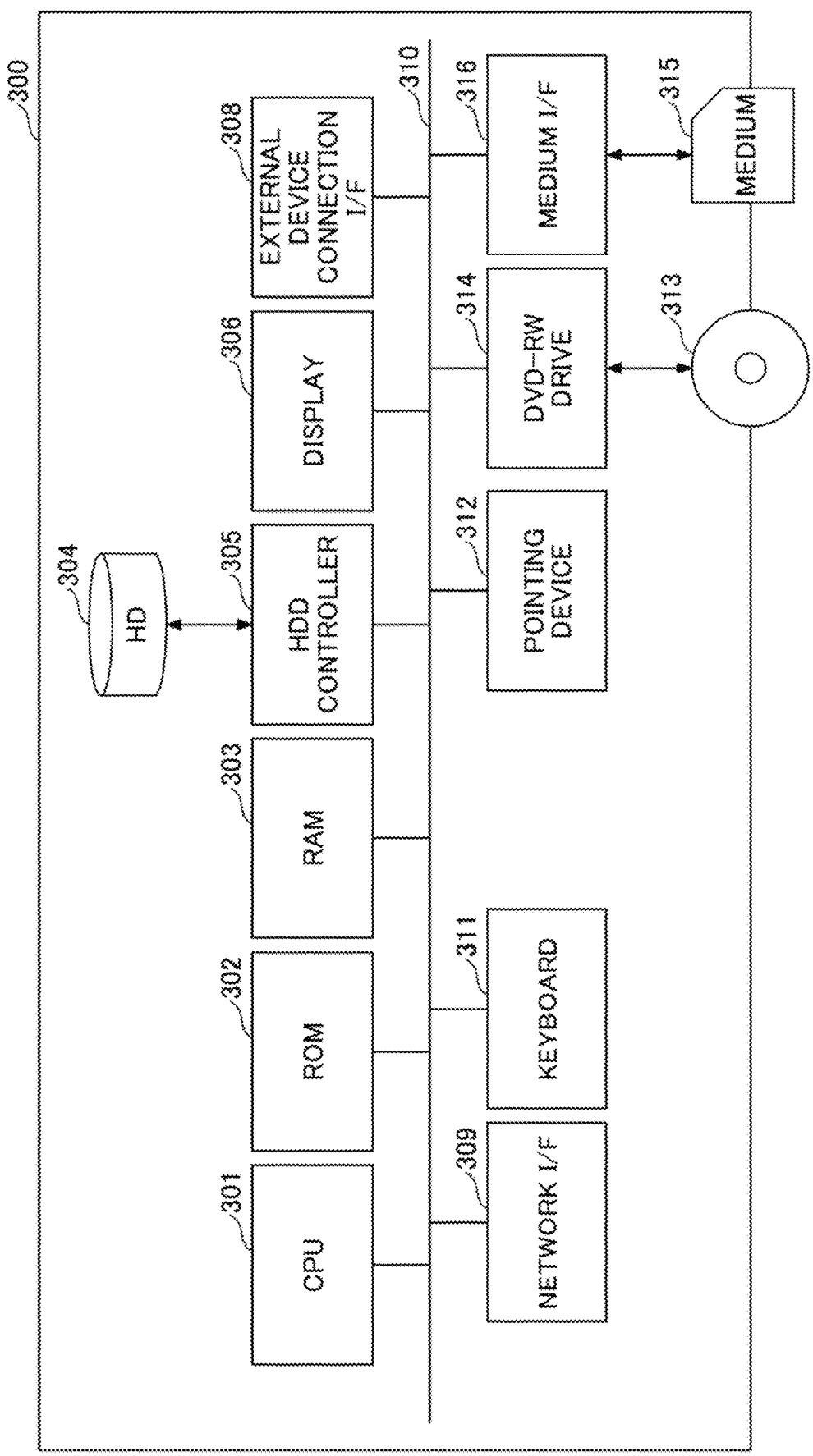
FIG. 15 is a hardware configuration diagram of a Software Defined Network (SDN) controller according to an embodiment of the present invention.

FIG. 15 is a hardware configuration diagram of the SDN controller 300. As illustrated in FIG. 15, the SDN controller 300 is constructed by a computer and includes a CPU 301, a ROM 302, a RAM 303, a hard disk (HD) 304, a Hard Disk Drive (HDD) controller 305, a display 306, an external device connection I/F 308, a network I/F 309, a bus line 310, a keyboard 311, a pointing device 312, a Digital Versatile Disk Rewritable (DVD-RW) drive 314, and a medium I/F 316, as illustrated in FIG. 15.

Among these, the CPU 301 controls the operations of the entire SDN controller 300. The ROM 302 stores a program used to drive the CPU 301, such as an IPL. The RAM 303 is used as the work area of the CPU 301. The HD 304 stores various kinds of data such as a program. The HDD controller 305 controls the reading or writing of various kinds of data to the HD 304 according to the control of the CPU 301. The display 306 displays various kinds of information such as a cursor, menus, windows, characters, or images. The external device connection I/F 308 is an interface for connecting various external devices. In this case, the external device may be, for example, a Universal Serial Bus (USB) memory or a printer. The network I/F 309 is an interface for performing data communication using the communication network 12. The bus line 310 is an address bus, a data bus, and the like for electrically connecting elements such as the CPU 301 illustrated in FIG. 15.

The keyboard 311 is a type of input means including a plurality of keys for inputting characters, numbers, various instructions, and the like. The pointing device 312 is a type of input means for selecting and executing various instructions, selecting a processing target, moving a cursor, and the like. The DVD-RW drive 314 controls the reading or writing of various kinds of data to a DVD-RW 313 as an example of a removable recording medium. The recording medium is not limited to a DVD-RW, but may be a Digital Versatile Disc Recordable (DVD-R), etc. The medium I/F 316 controls the reading or writing (storage) of data to a recording medium 315, such as a flash memory.

<Hardware Configuration of the Smartphone 400>

Figure 16:
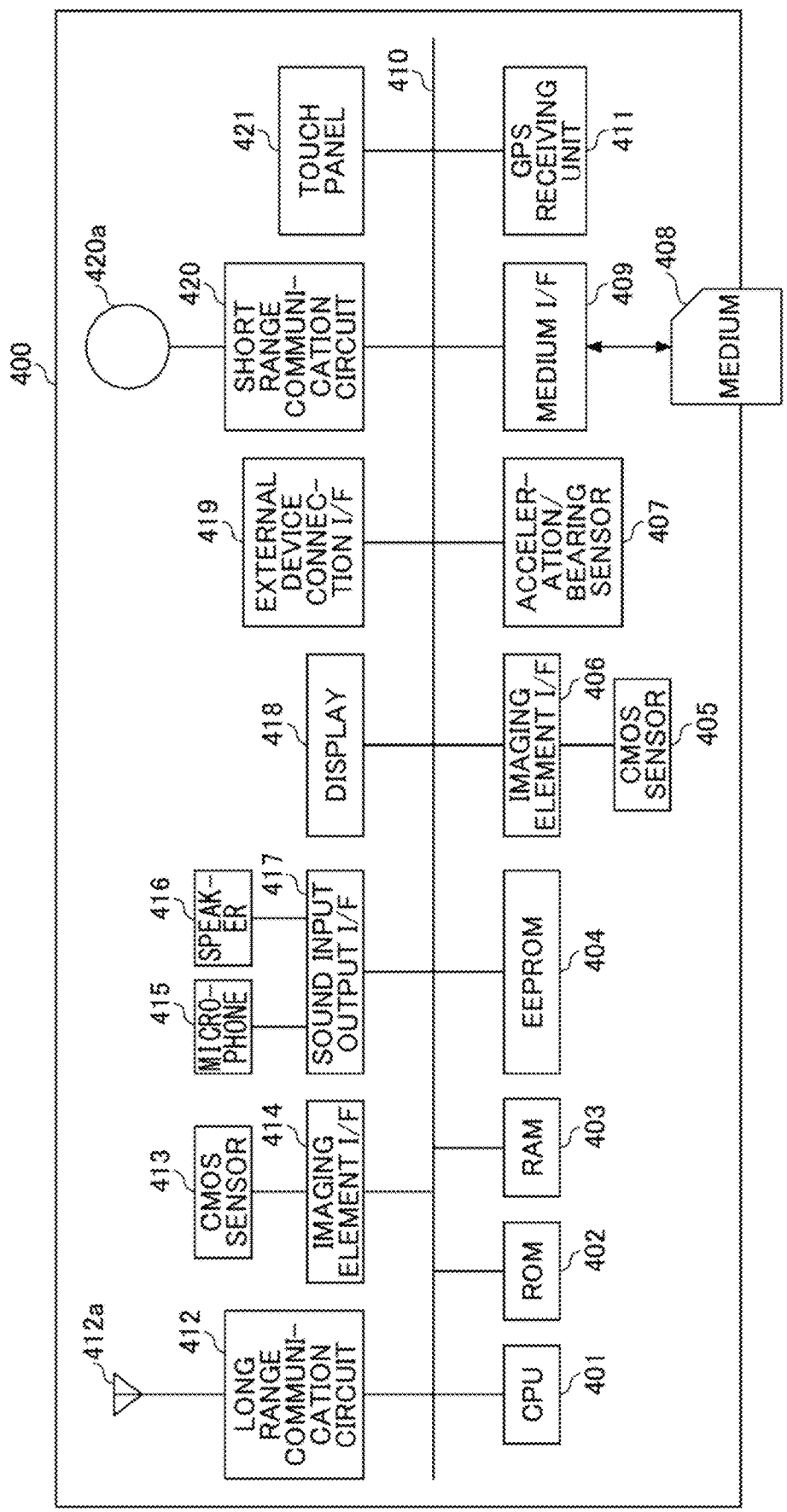
FIG. 16 is a hardware configuration diagram of a smartphone according to an embodiment of the present invention.

FIG. 16 is a hardware configuration diagram of a smartphone 400. As illustrated in FIG. 16, the smartphone 400 includes a CPU 401, a ROM 402, a RAM 403, an EEPROM 404, a Complementary Metal Oxide Semiconductor (CMOS) sensor 405, an imaging element I/F 406, an acceleration/bearing sensor 407, a medium I/F 409, and a global positioning system (GPS) receiving unit 411.

Among these, the CPU 401 controls the operations of the entire smartphone 400. The ROM 402 stores a program used to drive the CPU 401, such as an IPL. The RAM 403 is used as the work area of the CPU 401. The EEPROM 404 reads out or writes various kinds of data such as a smartphone program according to the control of the CPU 401. The CMOS sensor 405 is a type of built-in imaging means that captures a subject (mainly a self-image) according to the control of the CPU 401 and obtains image data. The sensor may be other imaging means, such as a Charge Coupled Device (CCD) sensor, instead of a CMOS sensor. The imaging element I/F 406 is a circuit that controls the drive of the CMOS sensor 405. The acceleration/bearing sensor 407 includes a variety of sensors, such as an electromagnetic compass, which detects geomagnetic fields, a gyrocompass, and an acceleration sensor. The medium I/F 409 controls the reading or writing (storage) of data to a recording medium 408, such as a flash memory. The GPS receiving unit 411 receives GPS signals from a GPS satellite.

The smartphone 400 also includes a long range communication circuit 412, a CMOS sensor 413, an imaging element I/F 414, a microphone 415, a speaker 416, a sound input output I/F 417, a display 418, an external device connection I/F 419, a short range communication circuit 420, an antenna 420a of the short range communication circuit 420, and a touch panel 421.

Among these, the long range communication circuit 412 is a circuit for communicating with other devices via the communication network 12. The CMOS sensor 413 is a type of built-in imaging means that captures a subject according to a control of the CPU 401 to obtain image data. The imaging element I/F 414 is a circuit that controls the drive of the CMOS sensor 413. The microphone 415 is a built-in circuit that converts sound to an electrical signal. The speaker 416 is a built-in circuit that converts electrical signals to physical vibrations to produce sound, such as music and speech. The sound input output I/F 417 is a circuit that processes the input and output of sound signals between the microphone 415 and the speaker 416 according to the control of the CPU 401. The display 418 is a type of display means such as a liquid crystal display or an organic Electro Luminescence (EL) display for displaying an image of a subject or various icons. The external device connection I/F 419 is an interface for connecting various external devices. The short range communication circuit 420 is a communication circuit such as Near Field Communication (NFC) or Bluetooth (registered trademark). The touch panel 421 is a type of input means by which a user presses the display 418 to operate the smartphone 400.

The smartphone 400 also includes a bus line 410. The bus line 410 is an address bus, a data bus, and the like for electrically connecting elements such as the CPU 401 illustrated in FIG. 16.

<Hardware Configuration of the File Server 500>

Figure 17:
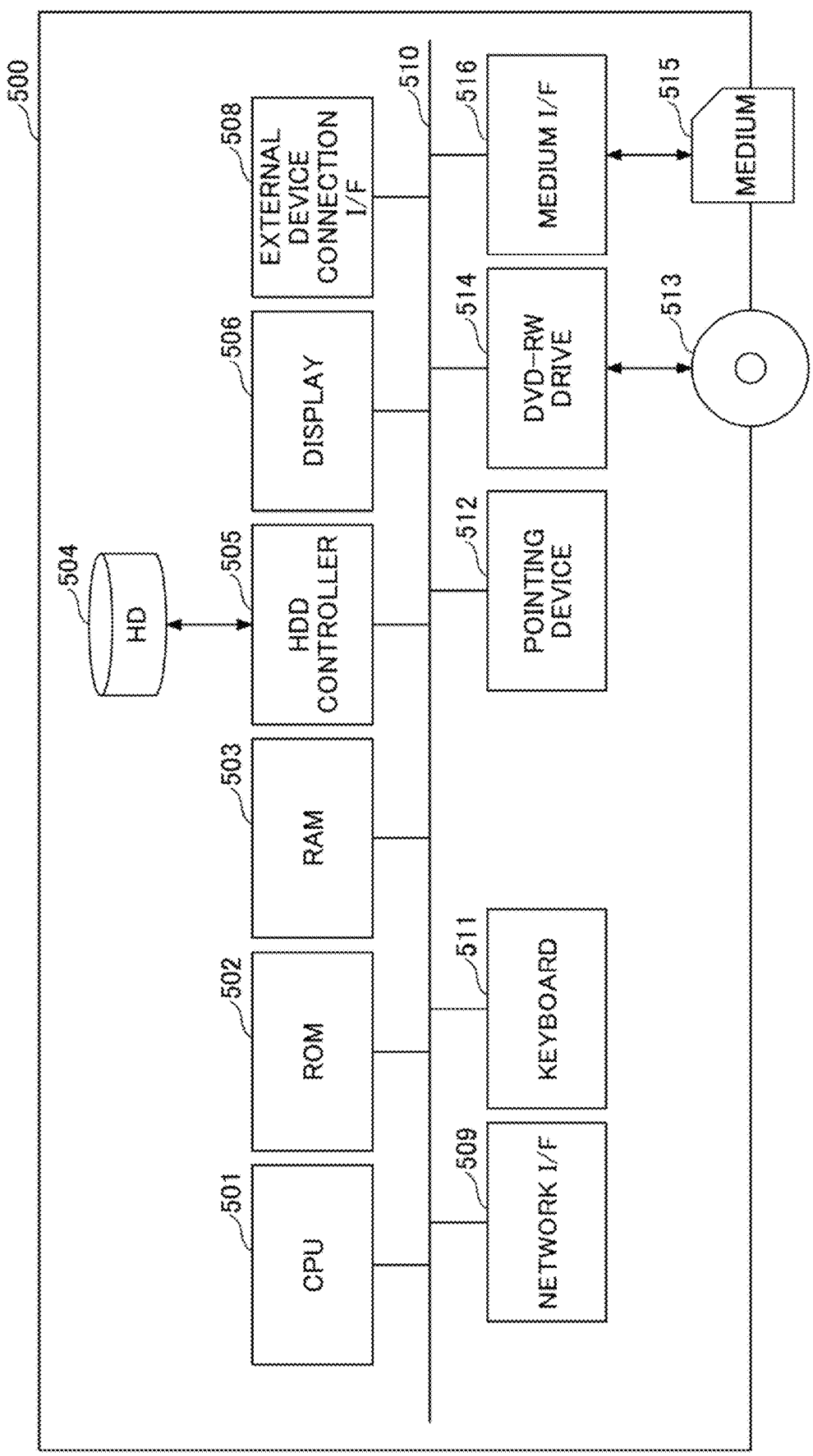
FIG. 17 is a hardware configuration diagram of a file server according to an embodiment of the present invention.

FIG. 17 is a hardware configuration diagram of the file server 500. As illustrated in FIG. 17, the file server 500 is constructed by a computer and includes a CPU 501, a ROM 502, a RAM 503, a HD 504, an HDD (hard disk drive) controller 505, a display 506, an external device connection I/F 508, a network I/F 509, a bus line 510, a keyboard 511, a pointing device 512, a DVD-RW drive 514, and a medium I/F 516 as illustrated in FIG. 17.

Among these, the CPU 501 controls the operations of the entire file server 500. The ROM 502 stores a program used to drive the CPU 501, such as an IPL. The RAM 503 is used as the work area of the CPU 501. The HD 504 stores various kinds of data such as a program. The HDD controller 505 controls the reading or writing of various kinds of data to the HD 504 according to the control of the CPU 501. The display 506 displays various kinds of information such as a cursor, menus, windows, characters, or images. The external device connection I/F 508 is an interface for connecting various external devices. In this case, the external device may be, for example, a USB (Universal Serial Bus) memory or a printer. The network I/F 509 is an interface for performing data communication using the communication network 12. The bus line 510 is an address bus, a data bus, and the like for electrically connecting elements such as the CPU 501 illustrated in FIG. 17.

The keyboard 511 is a type of input means including a plurality of keys for input of characters, numbers, various instructions, and the like. The pointing device 512 is a type of input means for selecting and executing various instructions, selecting a processing target, moving a cursor, and the like. The DVD-RW drive 514 controls the reading or writing of various kinds of data to a DVD-RW 513 as an example of a removable recording medium. The recording medium is not limited to a DVD-RW, but may be a DVD-R, etc. The medium I/F 516 controls the reading or writing (storage) of data to a recording medium 515, such as a flash memory.

<Functional Configuration of the Information Processing System 10>

Figure 18:
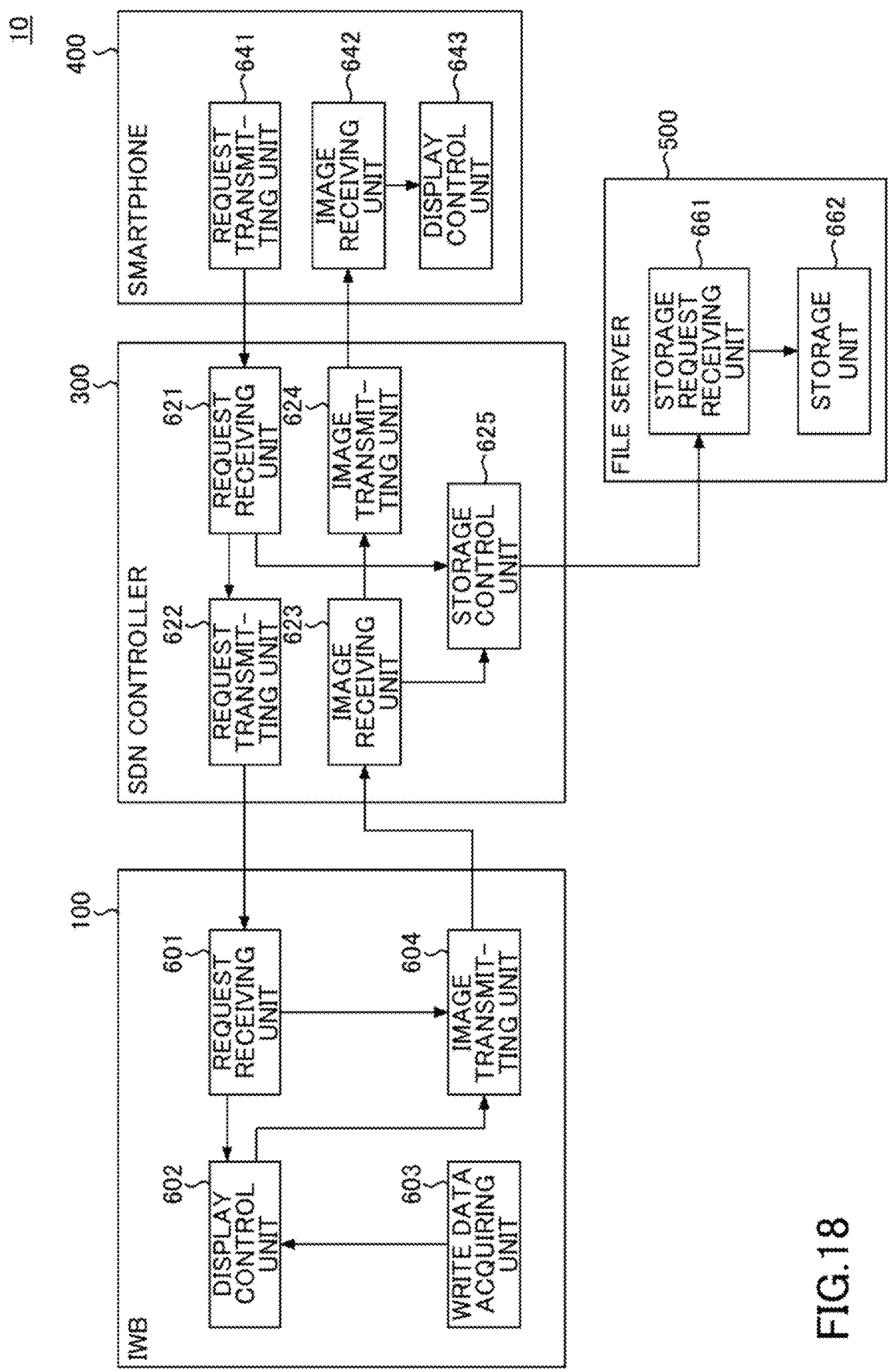
FIG. 18 is a diagram illustrating a functional configuration of the information processing system according to an embodiment of the present invention.

FIG. 18 is a diagram illustrating a functional configuration of the information processing system 10 according to an embodiment of the present invention. As illustrated in FIG. 18, the IWB 100 includes a request receiving unit 601, a display control unit 602, a write data acquiring unit 603, and an image transmitting unit 604.

The request receiving unit 601 receives various requests. For example, the request receiving unit 601 receives an image display request and an image acquisition request transmitted from the smartphone 400 via the SDN controller 300. The image display request includes an image file of an image to be displayed.

The display control unit 602 controls the display of an image by the display 180. For example, when an image display request is received by the request receiving unit 601, the display control unit 602 displays, on the display 180, an image based on an image file included in the image display request. When write data is acquired by the write data acquiring unit 603 (that is, when writing to an image has been performed), the display control unit 602 displays the write data by superimposing the write data on the image displayed on the display 180.

When the writing to the image displayed on the display 180 is detected by the contact sensor 114, the write data acquiring unit 603 acquires write data representing the content of the writing.

When an image acquisition request is received by the request receiving unit 601, the image transmitting unit 604 transmits an image file representing an image displayed on the display 180 (when writing has been performed, the image obtained after performing the writing), to the smartphone 400 via the SDN controller 300.

As illustrated in FIG. 18, the SDN controller 300 includes a request receiving unit 621, a request transmitting unit 622, an image receiving unit 623, an image transmitting unit 624, and a storage control unit 625.

The request receiving unit 621 receives an image display request for displaying an image on the IWB 100 and an image acquisition request for acquiring the image displayed on the IWB 100, transmitted from the smartphone 400. The image display request includes an image file of the image to be displayed by the IWB 100.

The request transmitting unit 622 determines whether a predetermined condition has been satisfied, and when the predetermined condition has been satisfied, the request transmitting unit 622 transfers various requests (an image display request or an image acquisition request) to the IWB 100. Examples of the predetermined condition include that various requests (an image display request or an image acquisition request) are received by the request receiving unit 621 and that a predetermined time period has elapsed. Information about the predetermined condition and the predetermined time period is stored in the request transmitting unit 622.

Here, the predetermined time period that is an example of a predetermined condition, is the time for the SDN controller 300 to transmit a storage request for storing an image to the file server 500, when an image storage operation relating to an image display request made from the smartphone 400 to the IWB 100, is not performed from the smartphone 400 or the IWB 100 within a time period set in advance in the SDN controller 300.

Accordingly, when there is no storage request from the smartphone 400 within this predetermined time period (that is, when it is determined that the predetermined condition is satisfied), the SDN controller 300 can automatically store image data in the file server 500 or another cloud file server, asynchronously with a storage request from the smartphone 400.

On the other hand, when a storage request is received from the smartphone 400 within the predetermined time period (that is, when it is determined that the predetermined condition is not satisfied), the SDN controller 300 can store an image in the file server 500 and the like according to the storage request.

According to the above configuration, in the present embodiment, it is possible to eliminate the troublesome tasks required in the conventional technology in which an explicit storage request from the user is required, and it is also possible to achieve both a storage process based on an explicit request from the user as well as a storage process by the SDN controller 300 that is asynchronous with a request from the user.

When an image acquisition request is transmitted to the IWB 100 by the request transmitting unit 622, the image receiving unit 623 receives an image file (that is, an image file of an image currently displayed on the IWB 100) transmitted from the IWB 100 in response to the image acquisition request.

The image transmitting unit 624 transmits the image file received by the image receiving unit 623 to the smartphone 400.

The storage control unit 625 controls the storage of an image, displayed on the IWB 100, into the file server 500. For example, when an image display request transmitted from the smartphone 400 is received by the request receiving unit 621, the storage control unit 625 stores the image file included in the display request (that is, the image file of the image before being displayed by the IWB 100) in the file server 500. For example, when the image receiving unit 623 receives the image file (that is, the image file of the image currently displayed on the IWB 100 and that is transmitted to the smartphone 400) from the IWB 100, the storage control unit 625 stores the image file in the file server 500. Accordingly, the storage control unit 625 can cause the file server 500 to store the image file of the image displayed by the IWB 100, every time an image file is transmitted from the smartphone 400 to the IWB 100 and every time an image acquisition request is transmitted from the smartphone 400.

As illustrated in FIG. 18, the smartphone 400 includes a request transmitting unit 641, an image receiving unit 642, and a display control unit 643. The request transmitting unit 641 transmits various requests (an image display request and an image acquisition request) to the SDN controller 300 via the web application provided by the SDN controller 300. The image receiving unit 642 receives an image file (that is, an image file of an image currently displayed on the IWB 100) transmitted from the SDN controller 300 via a web application provided by the SDN controller 300. The display control unit 643 displays, on the display 418, an image based on an image file received by the image receiving unit 642.

As illustrated in FIG. 18, the file server 500 includes a storage request receiving unit 661 and a storage unit 662. The storage request receiving unit 661 receives an image storage request transmitted from the SDN controller 300. The storage unit 662 stores an image file included in the image storage request received by the storage request receiving unit 661, in the storage of the file server 500.

Each function of the embodiment described above can be implemented by one or more processing circuits. As used herein, a "processing circuit" includes a processor programmed to execute each function by software, such as a processor implemented in electronic circuits, devices such as an Application Specific Integrated Circuit (ASIC), a digital signal processor (DSP), a field programmable gate array (FPGA), or a conventional circuit module, etc., designed to execute each function as described above.

<Sequence of Image Display Process>

Figure 19:
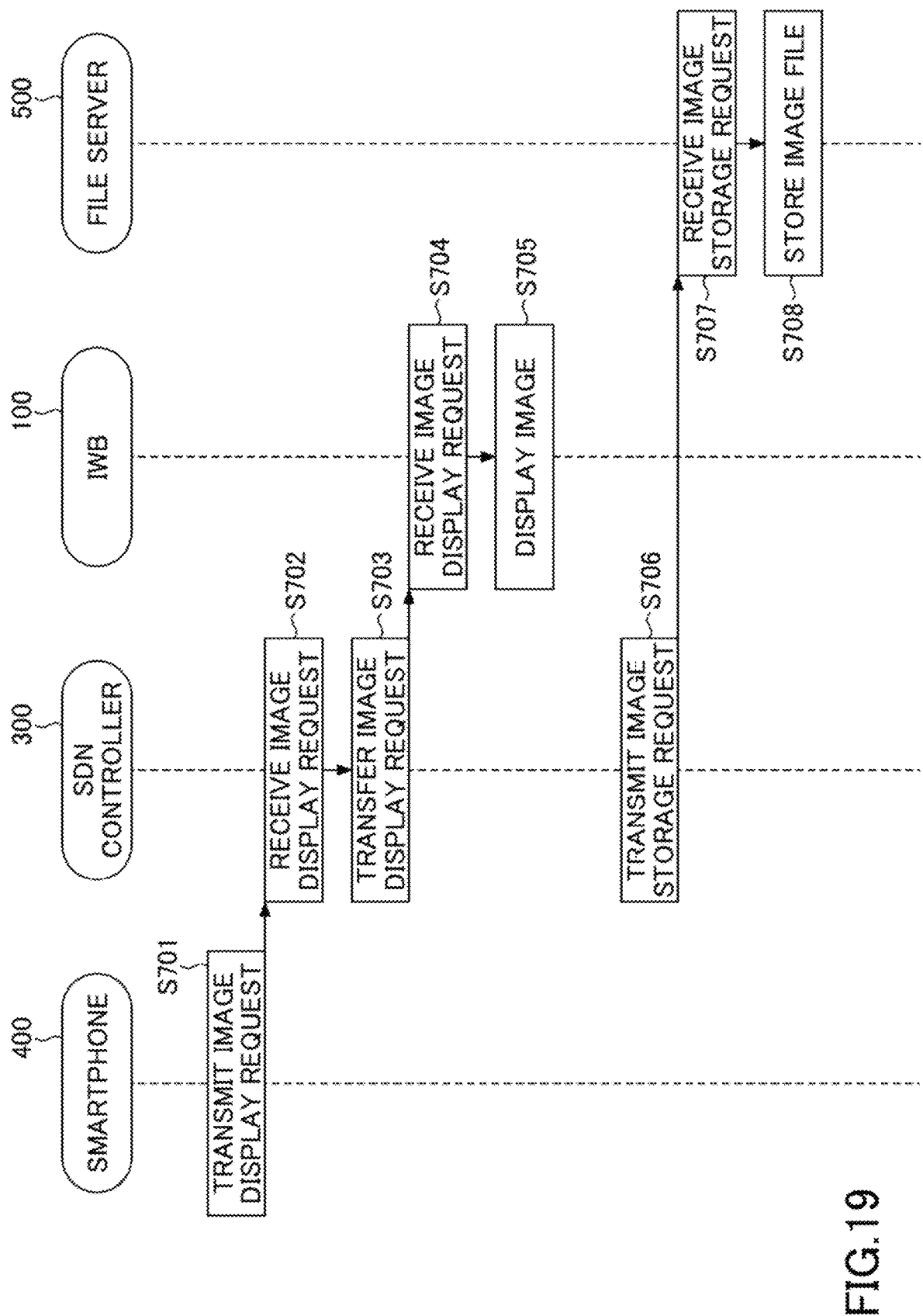
FIG. 19 is a sequence diagram illustrating a sequence of image display process by the information processing system according to an embodiment of the present invention.

FIG. 19 is a sequence diagram illustrating a sequence of an image display process by the information processing system 10 according to an embodiment of the present invention.

First, in the smartphone 400, the request transmitting unit 641 transmits an image display request to the SDN controller 300 by using the web application provided from the SDN controller 300 (step S701). This image display request includes an image file of any image.

Next, in the SDN controller 300, the request receiving unit 621 receives the image display request transmitted from the smartphone 400 (step S702). The request transmitting unit 622 transfers the image display request received in step S702, to the IWB 100 (step S703).

Next, in the IWB 100, the request receiving unit 601 receives the image display request transmitted from the SDN controller 300 (step S704). The display control unit 602 displays, on the display 180, an image based on the image file included in the image display request received in step S704 (step S705).

Next, in the SDN controller 300, the storage control unit 625 transmits an image storage request including the image file included in the image display request received in step S702, to the file server 500 (step S706).

Next, in the file server 500, when the storage request receiving unit 661 receives the image storage request transmitted from the SDN controller 300 (step S707), the storage unit 662 stores, in the storage of the file server 500, the image file included in the image storage request (step S708).

By the series of processes illustrated in FIG. 19, an image based on the image file transmitted from the smartphone 400 is displayed on the display 180 of the IWB 100, and the image file of the image is stored in the file server 500.

<Sequence of Image Acquisition Process>

Figure 20:
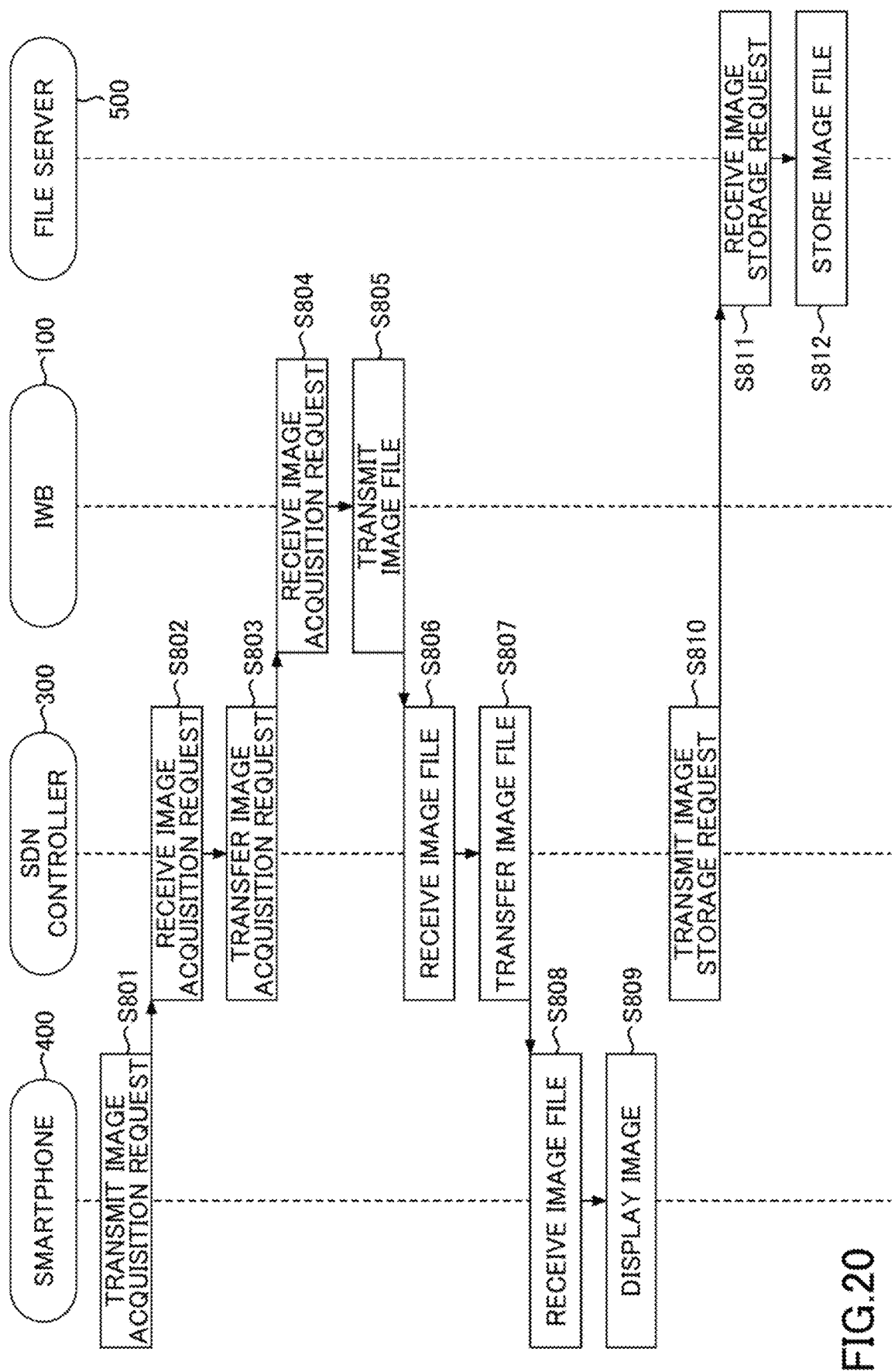
FIG. 20 is a sequence diagram illustrating a sequence of image acquisition process by the information processing system according to an embodiment of the present invention.

FIG. 20 is a sequence diagram illustrating a sequence of an image acquisition process by the information processing system 10 according to an embodiment of the present invention.

First, in the smartphone 400, the request transmitting unit 641 transmits an image acquisition request to the SDN controller 300 by using the web application provided from the SDN controller 300 (step S801).

Next, in the SDN controller 300, the request receiving unit 621 receives the image acquisition request transmitted from the smartphone 400 (step S802). The request transmitting unit 622 transfers the image acquisition request received in step S802 to the IWB 100 (step S803).

Next, in the IWB 100, the request receiving unit 601 receives the image acquisition request transmitted from the SDN controller 300 (step S804). The image transmitting unit 604 transmits an image file of an image displayed on the display 180 (when writing has been performed, an image obtained after performing the writing), to the SDN controller 300 (step S805).

Next, in the SDN controller 300, when the image receiving unit 623 receives the image file transmitted from the IWB 100 (step S806), the image transmitting unit 624 transfers the image file to the smartphone 400 (step S807).

Next, in the smartphone 400, when the image receiving unit 642 receives the image file transmitted from the SDN controller 300 (step S808), the display control unit 643 displays an image based on the image file on the display 418 of the smartphone 400 (step S809).

Next, in the SDN controller 300, the storage control unit 625 transmits an image storage request including the image file received in step S806, to the file server 500 (step S810).

Next, in the file server 500, when the storage request receiving unit 661 receives the image storage request transmitted from the SDN controller 300 (step S811), the storage unit 662 stores the image file included in the image storage request in the storage of the file server 500 (step S812).

By the series of processes illustrated in FIG. 20, an image based on an image file transmitted from the IWB 100 is displayed on the display 418 of the smartphone 400, and the image file of the image is stored in the file server 500.

Note that in each of the SDN controller 300, the IWB 100, and the smartphone 400, appropriate communication settings are made in advance to enable transmission and reception of image files with other apparatuses.

For example, in the SDN controller 300, display setting information is set in advance for transmitting an image file to the IWB 100 to display an image based on the image file on the IWB 100. Examples of display setting information include an apparatus name, an Internet Protocol (IP) address, the Uniform Resource Locater (URL) of an upload page, the URL for data transmission, the size of display screen, etc.

For example, in the IWB 100, a connection interface used for communication connection with the SDN controller 300 is set in advance. Specifically, in the IWB 100, for a setting item "INPUT", an appropriate item is set from among "Video Graphics Array (VGA)", "High-Definition Multimedia Interface (HDMI)", "DisplayPort", and "Digital Visual Interface (DVI)". For example, when a HDMI (registered trademark) interface is used for the communication connection with the SDN controller 300, "HDMI" is set for the setting item "INPUT".

Figures 21, 22:
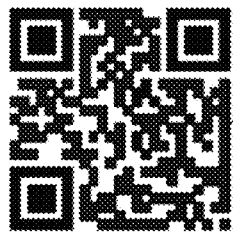
FIG. 21 is a diagram illustrating an example of connection information for connecting from a smartphone to an IWB according to an embodiment of the present invention.
FIG. 22 is a diagram illustrating an example of an upload page for uploading an image file from a smartphone to an IWB according to an embodiment of the present invention.

For example, after the Service Set Identifier (SSID) and password are input, the smartphone 400 may read connection information 2102, which is a two-dimensional code included in a print image 2100 (see FIG. 21) printed on a paper sheet in advance, thereby accessing the IWB 100 using the address obtained from the connection information 2102 and displaying an upload page 2200 (see FIG. 22) for uploading the image file to the IWB 100. A user of the smartphone 400 may transmit any image file from the displayed upload page 2200 to the IWB 100 to cause the IWB 100 to display an image based on the image file.

The SDN controller 300 may display the connection information 2102 on the display 180 included in the IWB 100 by transmitting a display request for displaying the connection information 2102, to the IWB 100. In this case, the smartphone 400 can read the connection information 2102 displayed on the display 180 of the IWB 100, and use an address obtained from the connection information 2102 to access the IWB 100.

As described above, according to an embodiment of the present invention, the SDN controller 300 includes the request receiving unit 621 that receives an image acquisition request transmitted from the smartphone 400, the request transmitting unit 622 that transmits the image acquisition request to the IWB 100 when the request receiving unit 621 receives the image acquisition request, the image receiving unit 623 that receives the image data transmitted from the IWB 100 in response to the image acquisition request, and the storage control unit 625 that stores the image data received by the image receiving unit 623 in the file server 500.

Accordingly, every time an image acquisition request is transmitted from the smartphone 400, the SDN controller 300 according to an embodiment stores the image file of the image displayed by the IWB 100 at that point in time, in the file server 500. Thus, according to the SDN controller 300 according to an embodiment, the image file of the image displayed on the IWB 100 can be stored more reliably in the file server 500 without requiring the user to perform troublesome tasks.

Therefore, according to the SDN controller 300 according to an embodiment, for example, even when the power of the IWB 100 is switched off without storing the image in the IWB 100, a plurality of terminal apparatuses including the smartphone 400 can acquire the image file of the image displayed on the IWB 100 from the file server 500.

Further, according to the SDN controller 300 according to an embodiment, the storage control unit 625 stores, in the file server 500, the image file of the image after writing is performed, when writing has been performed to the image displayed on the IWB 100.

Thus, according to the SDN controller 300 according to an embodiment, even when the power of the IWB 100 is switched off without storing the image obtained after performing writing in the IWB 100, a plurality of terminal apparatuses including the smartphone 400 can acquire, from the file server 500, the image file of the image obtained after performing the writing displayed on the IWB 100.

Further, according to the SDN controller 300 according to an embodiment, when an image file of an image before being displayed on the IWB 100 is transmitted from the smartphone 400 to the IWB 100, the image file is stored in the file server 500.

Thus, according to the SDN controller 300 according to an embodiment, a plurality of terminal apparatuses including the smartphone 400 can acquire, from the file server 500, the image before being displayed on the IWB 100 and the image after being displayed on the IWB 100.

The information processing system 10 according to an embodiment of the present invention includes the SDN controller 300, the smartphone 400, the IWB 100, and the file server 500.

Accordingly, the information processing system 10 according to an embodiment stores an image file in the file server 500 every time an image file is transmitted and received between the IWB 100 and the smartphone 400. Thus, according to the information processing system 10 according to an embodiment, the image file of the image displayed on the IWB 100 can be stored more reliably in the file server 500 without requiring the user to perform troublesome tasks.

The information processing method according to an embodiment of the present invention includes a request receiving step of receiving an image acquisition request of an image displayed on the IWB 100 from the smartphone 400, a request transmitting step of transmitting the image acquisition request to the IWB 100 when the image acquisition request is received in the request receiving step, an image receiving step of receiving the image data transmitted from the IWB 100 in response to the image acquisition request, and an image storage step of storing the image data received in the image receiving step in the file server 500.

Accordingly, in the information processing method according to an embodiment, every time an image acquisition request is transmitted from the smartphone 400, the image file of the image displayed on the IWB 100 at that time is stored in the file server 500. Thus, according to the information processing method according to an embodiment, the image file of the image displayed on the IWB 100 can be stored more reliably in the file server 500 without requiring the user to perform troublesome tasks.

While the preferred embodiments of the present invention have been described in detail above, the present invention is not limited to these embodiments, and various modifications or variations are possible within the scope of the present invention as defined in the appended claims.

For example, the timing at which the SDN controller 300 stores the image file is not limited to the timing at which the image file is transmitted and received between the IWB 100 and the smartphone 400. For example, when writing is not performed to an image displayed on the IWB 100 for a predetermined period of time (e.g., 2 minutes) or longer, the SDN controller 300 may acquire the image file of the image from the IWB 100 and cause the file server 500 to store the acquired image file. For example, the SDN controller 300 may acquire an image file of an image displayed on the IWB 100 from the IWB 100 at predetermined time intervals (e.g., 5 minutes) and cause the file server 500 to store the acquired image file.

For example, the "information processing apparatus" is not limited to an SDN controller, but may be a PC, a web application server, and the like. Each function of the "information processing apparatus" described above may be physically implemented by one apparatus or physically implemented by a plurality of apparatuses.

For example, "image display apparatus" is not limited to an IWB and may be any apparatus capable of at least any displaying an image.

For example, the SDN controller 300 may further include an output control unit that causes the file server 500 to output a list of a plurality of pieces of image data stored in the file server 500. In this case, the SDN controller 300 may transmit a list of a plurality of pieces of image data to the smartphone 400 to display a list of a plurality of pieces of image data on the smartphone 400.

According to an embodiment of the present invention, it is possible to more reliably store, in a shared storage destination, an image file of an image displayed on an image display apparatus, without requiring troublesome tasks by the user.

The information processing apparatus, the information processing system, and the information processing method are not limited to the specific embodiments described in the detailed description, and variations and modifications may be made without departing from the spirit and scope of the present invention.

What is claimed is:

1. An information processing apparatus comprising:
   processing circuitry; and
   a memory storing computer-executable instructions that cause the processing circuitry to:
   perform a function as a Web application server that is configured to provide a Web application to a terminal apparatus;
   automatically transmit an image acquisition request to acquire image data of an image displayed on an image display apparatus to the image display apparatus, asynchronously with a request from the terminal apparatus to acquire the image data of the image displayed on the image display apparatus, upon detecting that a predetermined condition is satisfied, said predetermined condition includes a condition as to whether a predetermined time lapses after a last request is received from the terminal apparatus;
   receive the image data of the image displayed on the image display apparatus, transmitted from the image display apparatus in response to the image acquisition request; and
   store the received image data in a shared storage destination.

2. The information processing apparatus according to claim 1, wherein the processing circuitry is further caused to:
   store, in the shared storage destination, the image data of an image obtained after performing writing into the image displayed on the image display apparatus, upon detecting that the writing into the image displayed on the image display apparatus is performed.

3. The information processing apparatus according to claim 1, wherein the processing circuitry is further caused to:
   store, in the shared storage destination, the image data of the image before being displayed on the image display apparatus, when the image data of the image before being displayed is transmitted from a terminal apparatus to the image display apparatus.

4. The information processing apparatus according to claim 1, wherein the processing circuitry is further caused to:
   control the shared storage destination to output a list of a plurality of pieces of image data stored in the shared storage destination.

5. An information processing system comprising:
   an information processing apparatus;
   an image display apparatus; and
   a shared storage destination, wherein
   the information processing apparatus includes:

processing circuitry; and a memory storing computer-executable instructions that cause the processing circuitry to:

perform a function as a Web application server that is configured to provide a Web application to a terminal apparatus;

automatically transmit an image acquisition request to acquire image data of an image displayed on an image display apparatus to the image display apparatus, asynchronously with a request from the terminal apparatus to acquire the image data of the image displayed on the image display apparatus, upon detecting that a predetermined condition is satisfied, said predetermined condition includes a condition as to whether a predetermined time lapses after a last request is received from the terminal apparatus;

receive the image data of the image displayed on the image display apparatus, transmitted from the image display apparatus in response to the image acquisition request; and store the received image data in the shared storage destination.

6. An information processing method comprising:

performing a function as a Web application server that is configured to provide a Web application to a mobile terminal;

automatically transmitting, by an information processing apparatus, an image acquisition request to an image display apparatus, asynchronously with a request from the terminal apparatus to acquire the image data of the image displayed on the image display apparatus, upon detecting that a predetermined condition is satisfied, said predetermined condition includes a condition as to whether a predetermined time lapses after a last request is received from the terminal apparatus;

receiving, by the information processing apparatus, image data of an image displayed on the image display apparatus, transmitted from the image display apparatus in response to the image acquisition request; and storing, by the information processing apparatus, the received image data in a shared storage destination.

* * * * *